(12) United States Patent
Sullivan et al.

(10) Patent No.: US 7,261,647 B2
(45) Date of Patent: Aug. 28, 2007

(54) NANO-PARTICULATE COMPOSITIONS FOR DECREASING THE WATER VAPOR TRANSMISSION RATE OF GOLF BALL LAYERS

(75) Inventors: Michael J. Sullivan, Barrington, RI (US); Derek A. Ladd, Acushnet, MA (US); William B. Lacy, Plymouth, MA (US)

(73) Assignee: Acushnet Company, Fairhaven, MA (US)

( * ) Notice: Subject to any disclaimer, the term of this patent is extended or adjusted under 35 U.S.C. 154(b) by 255 days.

(21) Appl. No.: 11/061,678

(22) Filed: Feb. 18, 2005

(65) Prior Publication Data

US 2006/0189412 A1   Aug. 24, 2006

(51) Int. Cl.
  *A63B 37/06*   (2006.01)
(52) U.S. Cl. ...................................................... 473/373
(58) Field of Classification Search ............... 473/373, 473/374, 378
  See application file for complete search history.

(56) References Cited

U.S. PATENT DOCUMENTS

| | | | |
|---|---|---|---|
| 4,091,083 A | 5/1978 | Hirschvogel | |
| 4,611,810 A | 9/1986 | Kamata | |
| 4,877,501 A | 10/1989 | Schnur et al. | |
| 4,895,713 A | 1/1990 | Greinke et al. | |
| 4,911,981 A | 3/1990 | Schnur et al. | |
| 4,990,291 A | 2/1991 | Schoen et al. | |
| 5,006,297 A | 4/1991 | Brown et al. | |
| 5,028,674 A | 7/1991 | Hatch et al. | |
| 5,334,673 A | 8/1994 | Wu | |
| 5,484,870 A | 1/1996 | Wu | |
| 5,580,927 A | 12/1996 | Chou et al. | |
| 5,692,974 A | 12/1997 | Wu et al. | |
| 5,703,166 A | 12/1997 | Harris et al. | |
| 5,733,428 A | 3/1998 | Calabria et al. | |
| 5,824,746 A | 10/1998 | Harris et al. | |
| 5,885,172 A | 3/1999 | Hebert et al. | |
| 5,908,358 A | 6/1999 | Wu | |
| 5,919,100 A | 7/1999 | Boehm et al. | |
| 5,981,658 A | 11/1999 | Rajagopalan et al. | |
| 6,001,930 A | 12/1999 | Lin | |
| 6,025,442 A | 2/2000 | Harris et al. | |
| 6,124,389 A | 9/2000 | Cavallaro et al. | |
| 6,142,887 A | 11/2000 | Sullivan et al. | |
| 6,150,462 A | 11/2000 | Rajagopalan et al. | |
| 6,162,135 A | 12/2000 | Bulpett et al. | |
| 6,180,040 B1 | 1/2001 | Ladd et al. | |
| 6,180,722 B1 | 1/2001 | Dalton et al. | |
| 6,187,864 B1 | 2/2001 | Rajagopalan | |
| 6,193,619 B1 | 2/2001 | Wu et al. | |
| 6,204,331 B1 | 3/2001 | Sullivan et al. | |
| 6,207,784 B1 | 3/2001 | Rajagopalan | |
| 6,221,960 B1 | 4/2001 | Rajagopalan | |
| 6,232,400 B1 | 5/2001 | Harris et al. | |
| 6,245,862 B1 | 6/2001 | Rajagopalan | |
| 6,280,759 B1 | 8/2001 | Price et al. | |
| 6,290,611 B1 | 9/2001 | Rajagopalan et al. | |
| 6,291,592 B1 | 9/2001 | Bissonnette et al. | |
| 6,353,058 B1 | 3/2002 | Rajagopalan | |
| 6,414,082 B1 | 7/2002 | Rajagopalan et al. | |
| 6,454,666 B1 | 9/2002 | Shira | |
| 6,458,895 B1 | 10/2002 | Wrigley et al. | |
| 6,465,578 B1 | 10/2002 | Bissonnette et al. | |
| 6,476,130 B1 | 11/2002 | Rajagopalan et al. | |
| 6,485,378 B1 | 11/2002 | Boehm | |
| 6,494,795 B2 | 12/2002 | Sullivan | |
| 6,653,382 B1 | 11/2003 | Statz et al. | |
| 6,710,114 B2 | 3/2004 | Bissonnette et al. | |
| 6,793,592 B2 | 9/2004 | Sullivan et al. | |
| 6,794,447 B1 | 9/2004 | Kim et al. | |
| 6,808,461 B2 | 10/2004 | Harris et al. | |
| 6,919,395 B2 | 7/2005 | Rajagopalan et al. | |
| 6,953,820 B2 | 10/2005 | Statz et al. | |
| 7,004,854 B2 * | 2/2006 | Hogge et al. | 473/374 |
| 2001/0024982 A1 | 9/2001 | Cavallaro et al. | |
| 2001/0056197 A1 | 12/2001 | Albert et al. | |
| 2003/0050373 A1 | 3/2003 | Chen | |
| 2003/0100656 A1 | 5/2003 | Majumdar et al. | |
| 2003/0114565 A1 | 6/2003 | Chen et al. | |
| 2003/0130062 A1 * | 7/2003 | Morgan et al. | 473/357 |
| 2003/0171163 A1 * | 9/2003 | Hogge et al. | 473/351 |

(Continued)

FOREIGN PATENT DOCUMENTS

JP    11-244419    9/1999

(Continued)

OTHER PUBLICATIONS

Dagani, R. "Building From the Bottom Up," Chemical & Engineering News, Oct. 16, 2000, p. 27.

(Continued)

*Primary Examiner*—Raeann Trimiew
(74) *Attorney, Agent, or Firm*—William B. Lacy

(57) ABSTRACT

A golf ball including a core; a cover having a first water vapor transmission rate; and a vapor barrier layer disposed between the core and the cover, the barrier layer being formed from a polymer including a nano-material having an average particle size of 100 nm or less; wherein the nano-material creates a tortuous path across the barrier layer such that the barrier layer has a second water vapor transmission rate less than the first.

19 Claims, No Drawings

U.S. PATENT DOCUMENTS

| | | | |
|---|---|---|---|
| 2003/0224877 A1* | 12/2003 | Sullivan et al. | 473/374 |
| 2004/0018895 A1 | 1/2004 | Bulpett et al. | |
| 2004/0092336 A1 | 5/2004 | Kim et al. | |
| 2004/0185963 A1* | 9/2004 | Hogge et al. | 473/371 |
| 2005/0003180 A1 | 1/2005 | Kondos | |
| 2005/0059756 A1 | 3/2005 | Kim et al | |

FOREIGN PATENT DOCUMENTS

| | | |
|---|---|---|
| WO | WO 00/23519 | 4/2000 |
| WO | WO 01/29129 | 4/2001 |
| WO | WO 01/43832 | 6/2001 |
| WO | WO 00202193 | 1/2002 |
| WO | WO 0020923 | 2/2002 |

OTHER PUBLICATIONS

Sherman, L. M. "Nanocomposites a Little Goes a Long Way," Plastics Technology, Jun. 1999, p. 52.

Dagani, R. "Putting the 'Nano' Into Composites," Science/Technology, Jun. 7, 1999, vol. 77, No. 23, pp. 25-37.

Petrovic, Z. S.; Javni, I.; Waddon, A. "Polyurethane Elastomers With Nano-Fillers", Conference Proceedings at ANTEC 1998, Atlanta, Georgia, Apr. 26, 1998, p. 225.

Kressler, J.; Thomann, R. "Nanocomposites Based on a Synthetic Layer Silicate and Polyamide-12," Conference Proceedings at ANTEC 1998, Atlanta, Georgia, Apr. 26, 1998, p. 447.

Haddad, T. S.; Schwab, J.; Mather, P. T.; Romo-Uribe, A.; Otonari, Y.; Carr, M. J.; Lichtenhan , J. D. "The Rational Design of Silsesquioxane-Based Polymers", Conference Proceedings at ANTEC 1997, Toronto, Canada, Apr. 27, 1997, vol. II-Materials, p. 1814.

Novak, B. M.; Ellsworth, M. W.; Verrier, C. "Organic-Inorganic Nanocomposite Materials. Mechanical and Thermal Properties," Polymeric Materials Science and Engineering, American Chemical Society Spring Meetiing, 1994, San Diego, California, vol. 70, p. 266.

* cited by examiner

NANO-PARTICULATE COMPOSITIONS FOR DECREASING THE WATER VAPOR TRANSMISSION RATE OF GOLF BALL LAYERS

FIELD OF THE INVENTION

This invention relates generally to compositions for golf ball cores, intermediate layers, and covers and, in particular, compositions comprising a variety of nano-materials for improving golf ball material water vapor transmission rate without detrimentally affecting material characteristics and/or golf ball performance.

BACKGROUND

Golf balls have a variety of constructions. Solid golf balls include one-piece, two-piece (i.e., solid core and a cover), and multi-layer (i.e., solid core of a center and one or more layers and a cover of one or more layers) golf balls. Wound golf balls typically include a solid, hollow, or fluid-filled center, surrounded by a tensioned elastomeric material, and a cover. While solid golf balls now dominate the marketplace because of their distance, lower cost, and durability, manufacturers are constantly trying to improve the "feel" of solid balls in an attempt to make it more like that associated with a wound construction.

By the materials used for golf ball construction, manufacturers can vary a wide range of playing characteristics, such as compression, velocity, "feel," and spin, each of which can be optimized for various playing abilities. In particular, a variety of core and cover layer(s) constructions and compositions have been investigated, such as polymeric compositions and blends, including polybutadiene rubbers, polyurethanes, and ionomers. These 'conventional' materials, however, have inherent limitations in their properties.

It is now believed that blending nano-materials with conventional materials can improve the properties of the virgin material. It is also believed that forming golf ball layers with conventional materials in 'nano' sizes can provide improved properties compared to that of the same 'larger' material. The properties that can be improved include, but are not limited to, density, dimensional stability, stiffness, abrasion resistance, moisture transmission, and resiliency. Nanomaterials are unique because of their size and shape, and because they can be selectively modified by chemical or other sources at an atomic or molecular level. These nanomaterials, therefore, provide novel and sometimes unusual material properties (even at lower loading levels), such as increased modulus (in some cases even lower hardness), elongation at break, optical property, barrier to moisture, abrasion resistance, low hysteresis, and surface appearance, especially compared to identical materials of conventional (larger) size. These unique properties may be utilized for golf ball construction in manners previously not available.

One property in particular is important to golf ball construction—water vapor transmission rate (WVTR). Many conventional golf ball materials have elevated WVTR, allowing other golf ball materials to be degraded. One example is polyurethane, which can allow water vapor to diffuse into the polybutadiene core, causing a degradation of core velocity over time. There remains a need, therefore, to develop ways to decrease the WVTR, preferably without having to add an extra layer to the golf ball, without the layer inhibiting desirable golf ball properties. It is believed that the incorporation of nano-sized materials, in particular those that can provide a tortuous path through which water transmission is inhibited, will accomplish this endeavor.

SUMMARY OF THE INVENTION

The present invention is directed to a golf ball including a core, a cover having a first water vapor transmission rate, and a vapor barrier layer disposed between the core and the cover. The barrier layer is preferably formed from a polymer comprising a nano-material having an average particle size of 100 nm or less; wherein the nano-material creates a tortuous path across the barrier layer such that the barrier layer has a second water vapor transmission rate less than the first.

In one embodiment, the second water vapor transmission rate is 0.45 $(g \cdot mm)/(m^2 \cdot day)$ or less, and in a preferred embodiment, the second water vapor transmission rate is 0.25 $(g \cdot mm)/(m^2 \cdot day)$ or less.

The barrier layer is typically formed from a polymer such as ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers and their ionomers, or cationic ionomers.

The nano-material can be swellable layered materials; micaceous minerals; smectite minerals; carbon nanotubes; fullerenes; nanoscale titanium oxides; iron oxides; ceramics; modified ceramics; metal and oxide powders; titanium dioxide particles; single-wall and multi-wall carbon nanotubes; polymer nanofibers; carbon nanofibrils; nitrides; carbides; sulfides; ormocers; glass ionomers; resin-modified glass ionomers; silicon ionomers; polymerizable cements; metal-oxide polymer composites; lipid-based nanotubules, graphite sheets, or polyhedral oligomeric silsequioxanes.

Swellable layered materials are preferred and generally include phyllosilicates, montmorillonite, sodium montmorillonite; magnesium montmorillonite; calcium montmorillonite; nontronite; beidellite; volkonskoite; hectorite; saponite; sauconite; sobockite; stevensite; svinfordite; or vermiculite. Ideally, the swellable layered material includes phyllosilicates having a negative charge ranging from about 0.15 to about 0.9 charges per formula unit and a commensurate number of exchangeable metal cations.

In another preferred embodiment, the nano-materials include graphite sheets, swellable layered materials, or platelet materials. Preferably, the nano-materials are chemically-modified.

The golf ball core has an outer diameter of 1.5 inches to 1.6 inches. If the core is a dual core, including a solid center and an outer core layer, the outer diameter of the solid center is 0.5 inches to 1.25 inches. The core can be formed from a rubber-based polymer or a polymer comprising an acid group fully-neutralized by a salt of an organic acid, a cation source, or a suitable base of the organic acid.

The cover layer is preferably formed from a polyurethane, a polyurea, a polyurea-urethane, or a polyurethane-urea. In a preferred embodiment, the cover layer includes the nano-materials such that it has a water vapor transmission rate of 0.45 $((g \cdot mm)/(m^2 \cdot day))$ or less. Most preferably, the cover layer has a thickness of 0.005 inches to 0.05 inches.

The present invention is also directed to a golf ball including a rubber-based core having an outer diameter of 1.5 inches to 1.55 inches, a cover layer comprising a polyurethane or a polyurea and having a first water vapor transmission rate, and a vapor barrier layer disposed between the core and the cover. The barrier layer being formed from a polymer comprising a nano-material having an average particle size of 100 nm or less; wherein the nano-materials create a tortuous path across the barrier layer such that the barrier layer has a second water vapor transmission rate less than the first; and are selected from the group consisting of swellable layered materials; micaceous minerals; smectite minerals; carbon nanotubes; fullerenes; nanoscale titanium oxides; iron oxides; ceramics; modified ceramics; metal and oxide powders; titanium dioxide particles; single-wall and multi-wall carbon nanotubes; polymer nanofibers; carbon nanofibrils; nitrides; carbides; sulfides; ormocers; glass ionomers; resin-modified glass ionomers; silicon ionomers; polymerizable cements; metal-oxide polymer composites; lipid-based nanotubules, graphite sheets, and polyhedral oligomeric silsequioxanes.

Preferably, the cover layer is formed from a color-stable material that is fully saturated. In another preferred embodiment, the barrier layer includes a polymer selected from the group consisting of ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers and their ionomers, cationic ionomers, anionic ionomers, polyurethanes, and polyureas.

DEFINITIONS

As used herein, the terms "nanoparticulate" and "nanoparticle" refer to average particle size diameters of 100 nm or less; it should be understood that nano-materials in cylindrical or tubular form may have lengths greater than 100 nm, typically as high as 1000 nm, but still have average diameters of 100 nm or less.

As used herein, the term "layered material" refers to an inorganic material, such as a smectite clay mineral, that is in the form of a plurality of adjacent layers and has a typical thickness, for each layer, of about 100 Å.

As used herein, the terms "intercalate" or "intercalated" refer to a layered material that includes oligomer and/or polymer molecules disposed between adjacent layers of the layered material to increase the interlayer spacing between the adjacent platelets to at least 10 Å.

As used herein, the terms "exfoliate" or "exfoliated" refer to individual layers of an intercalated material so that adjacent layers of the intercalated material can be dispersed individually throughout a carrier material, such as a matrix polymer.

As used herein, the term "nanocomposite" refers to an oligomer, polymer or copolymer having dispersed therein an exfoliated and/or an intercalated material.

As used herein, the term "matrix polymer" refers to a thermoplastic or thermosetting polymer in which the exfoliate is dispersed to form a nanocomposite.

DETAILED DESCRIPTION

The golf balls of the present invention include a core and a cover surrounding the core, at least one of which is formed from a composition comprising a nanoparticulate material or a blend of a nanoparticulate material with polymeric and/or rubber materials. The core and/or the cover may have more than one layer and an intermediate layer may be disposed between the core and the cover of the golf ball. The golf ball cores of the present invention may comprise any of a variety of constructions. For example, the core of the golf ball may comprise a solid sphere or may be a solid center surrounded by at least one intermediate or outer core layer. The center of the core may also be a liquid filled sphere surrounded by at least one core layer. The intermediate layer or outer core layer may also comprise a plurality of layers. The core may also comprise a solid or liquid filled center around which tensioned elastomeric material is wound. The cover layer may be a single layer or, for example, formed of a plurality of layers, such as an inner cover layer and an outer cover layer. A non-structural layer, such as a water vapor barrier layer, may also be included between any two layers or even as a coating layer.

While the various golf ball centers, cores, and layers may be formed of any materials known to those skilled in the art, the present invention is particularly directed to compositions comprising nanoparticulates, the compositions being suitable for any of the above golf ball components.

Nanoparticulates are generally divided into three categories: organic, inorganic, and metallic, all of which are suitable for use in compositions for golf ball components. Because of their sub-micron size (particle size of 100 nm or less), a higher concentration of particles (greater surface area) are available to interact with the surrounding polymer or rubber materials, dramatically increasing their effect on the properties of the compositions at concentrations much lower than conventionally required. This, for example, might allow the golf ball construction to take on a form not previously available (i.e., increasing weight of another layer as a result of the lower amount of nanoparticulate (and therefore decreased weight) used.

Because the nanometer-sized particles have such a large surface area, small quantities of nanomaterials can have an intimate interactions and compatibility with the host matrix, typically a polymeric material, not available to conventional-sized particles. These interactions can cause significant property changes in the compositions. For example, a 3% to 5% loading of nanoclay into a polymer blend will exhibit properties similar to 20% to 60% loading of conventional reinforcing agents such as kaolin, silica, talc, and carbon black. The resulting compositions are generally referred as "nanocomposites." Preferably, the nanoparticles of the present invention have a surface area of at least about 100 $m^2/g$, more preferably at least about 250 $m^2/g$, and most preferably at least about 500 $m^2/g$.

The nanomaterials typically have particle sizes ranging from about 0.9 nm up to 100 nm in diameter and have an aspect ratio of about 100 to about 1000. Any swellable layered material that sufficiently sorb the intercalant polymer to increase the interlayer spacing between adjacent platelets to at least about 10 Å (when the phyllosilicate is measured dry) may be used. Useful swellable layered materials include, but are not limited to, phyllosilicates, such as smectite clay minerals, e.g., montmorillonite, particularly sodium montmorillonite; magnesium montmorillonite; and/or calcium montmorillonite; nontronite; beidellite; volkonskoite; hectorite; saponite; sauconite; sobockite; stevensite; svinfordite; vermiculite; and the like.

Other useful layered materials include micaceous minerals, such as illite and mixed layered illite, and smectite minerals, such as ledikite, and admixtures of illites with the clay minerals named above. Other layered materials having little or no charge on the layers may be useful in this invention provided they can be intercalated with the intercalant polymers to expand their interlayer spacing to at least about 10 Å. Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

The interlayer spacing is measured when the layered material is "dry," containing 3% to 6% by weight water, based on the dry weight of the layered material. The preferred clay materials generally include interlayer cations, such as $Na^+$, $Ca^{+2}$, $K^+$, $Mg^{+2}$, $NH_4^+$, and the like, including mixtures thereof.

Preferably, the compositions of the present invention comprise inorganic nanomaterials, such as chemically-modified montmorillonite clays and polymer grade montmorillonites, commercially available from Nanocor Company of Arlington Heights, Ill., and CLOISITE®, commercially available from Southern Clay Products of Widner, United Kingdom.

The compositions of the present invention may also comprise organic nanomaterials like polyhedral oligomeric silsequioxanes, essentially chemically modified nano-scale particles of silica. Examples of these materials include POSS®, commercially available from Hybrid Plastics of Fountain Valley, Calif.

The compositions of the present invention may also include other nanomaterials including, but not limited to, carbon nanotubes; fullerenes; nanoscale titanium oxides; iron oxides; ceramics; modified ceramics, such as organic/inorganic hybrid polymers; metal and oxide powders (ultrafine and superfine); titanium dioxide particles; single-wall and multi-wall carbon nanotubes; polymer nanofibers; carbon nanofibrils; nitrides; carbides; sulfides; gold nanoparticles; and mixtures thereof.

"Hybrid" nanomaterials are also suitable for the compositions of the present invention and include, but are not limited to, glass ionomers, ormocers, and other inorganic-organic materials. The "hybrid" materials of the present invention may be described by a number of lexicons including, but not limited to, glass ionomers, resin-modified glass ionomers, silicon ionomers, dental cements or restorative compositions, polymerizable cements, metal-oxide polymer composites, and ionomer cements.

Ormocers are composite materials formed of ceramic and polymer networks that combine and interpenetrate with one another. The ormocers of the present invention typically have particle diameters in the range of from about 10 nm to about 300 nm. Preferably, the particle diameters are from about 20 nm to about 200 nm. The ormocers generally have a surface area of about 4 $m^2/g$ to about 600 $m^2/g$, more preferably about 10 $m^2/g$ to about 50 $m^2/g$.

Ormocers are also composite materials which have a network of organic and inorganic polymers intertwined in one another. The expression "network" designates a three-dimensional arrangement of substances covalently bound to one another. The organic network fills empty sites of the inorganic network, so that the two networks are firmly bound to one another. In this connection, inorganic means that the main chains are formed, in particular, of —Si—O— bonds, which can be both linear as well as branched. The Si atoms of the inorganic network can be replaced, partially, by other metal or semimetal atoms including, but not limited to, Al, B, Zr, Y, Ba, and Ti. The organic network is obtained by the polymerization of organic monomers, in particular, vinyl ether radicals, wherein other monomers, which can be copolymerized with vinyl ether radicals can be included. The organic network of ormocers, in accordance with the invention, can be obtained by the hydrolytic condensation of one or more silicon compounds, wherein preferred silicon compounds are monomeric silanes.

Suitable ormocer production methods are disclosed in U.S. Patent Application No. 2001/0056197, filed Dec. 27, 2001, the disclosure of which is incorporated herein, in its entirety, by express reference thereto.

In accordance with an aspect of the invention, a moisture vapor barrier layer, which can be formed from any material disclosed herein, may also have nanoparticulates, including ormocers, disposed therein. Vapor barrier layers prevent or minimize the penetration of moisture, typically water vapor, into the core of the golf ball. The nanoparticles are preferably hydrophobic and create a more tortuous path for the water molecules across the water vapor barrier layer to reduce the water vapor transmission rate ("WVTR") of the layer. The barrier layers may also include nanoscale ceramic particles, flaked glass, and flaked metals (e.g., micaceous materials, iron oxide or aluminum). In one embodiment, ormocers are employed as a water vapor barrier layer disposed between the core and cover layers. Preferably, the water vapor barrier layer preferably has a water vapor transmission rate that is lower than that of the cover, and more preferably less than the water vapor transmission rate of an ionomer resin such as SURLYN®, which is in the range of about 0.45 to about 0.95 $(g \cdot mm)/(m^2 \cdot day)$. The water vapor transmission rate is generally measured using the ASTM F1249-90, 1653-99, or F372-99 standards.

Any of the disclosed nanoparticulates are effective as water vapor barrier layers, and have the particular advantage of improving (decreasing) the WVTR of layer materials in their virgin state. Preferably, the WVTR is improved by at least 10% more preferably by 25%%, most preferably by 50%. Optionally, ormocers (and/or other nanoparticulates) may be used in barrier layer(s) and/or coating layer(s), situated over the core, intermediate layers, or cover layers, most preferably over the cover layer.

Compositions comprising a liquid material and a powder material, wherein the liquid material comprises 4-methacryloxyethyl trimellitic acid and water and the powder material comprises a powdered fluoroalumino silicate glass or a powdered metal oxide containing zinc oxide as the major component, are also suitable. Other suitable materials include aluminofluorosilicate glasses having the following features: a ratio of Al to Si of 0.57-1.12 by mass; a total content of Mg and Ba of 29-36% by mass; a ratio of Mg to Ba of 0.028-0.32 by mass; and a content of P of 2-10% by mass. Fluoroaluminosilicate glass powders having a specific gravity of 2.4 to about 4.0, a mean particle size of 0.02 to 1 μm or less, preferably 200 nm to 100 nm, and a BET specific surface area of 2.5.about.6.0 $m^2/g$ are also suitable. Preferably they have a maximum particle size of less than 100 nm and contain 10 to about 21% by weight of $Al^{3+}$, about 21% by weight of $Si^{4+}$, about 20% by weight of $F^-$, and about 34% by weight in total of $Sr^{2+}$ and/or $Ca^{2+}$ in its components.

Glass powders for glass ionomer cements are also suitable hybrid materials. These powders have a shape in which a major axis length is from 3 to 1,000 times a minor axis length, in a glass powder for glass ionomer cement. The glass powder for glass ionomer cement having a shape in which a major axis length is from 3 to 1,000 times a minor axis length is a fibrous glass having a minor axis length of from 0.1 to 100 nm and a major axis length of less than 100 nm, and its content is within a range of from 0.1 to 80% by weight.

Other suitable "hybrid" materials include a polymerizable composition comprising a polymerizable resin composition and a filler composition comprising a bound, nanostructured colloidal silica. These composites comprise a resin composition and a filler composition, wherein the filler composition comprises a nanostructured, bound silica, preferably in the form of nanosized particles having their largest dimensions in the range from about 10 to about 50 nm. Silica particles are preferably bound so as to result in chains having lengths in the range from about 50 nm to about 400 nm.

One preferred composition comprises a binder and a filler wherein the filler is comprised of about 1% to about 50% by weight alumina, about 50% by weight to about 98% by weight silica, and boron. Another preferred composition comprises: about 15% to about 30% by weight alumina fiber; about 65% to about 85% by weight silica fiber; about 1% to about 3% by weight silicon carbide; and about 1% to about 5% by weight boron nitride. Another more preferred fused-fibrous composition for the filler is as follows: about 21% by weight alumina fiber; about 74% by weight silica fiber; about 2% by weight silicon carbide; and about 2.85% by weight boron nitride. Preferably, the "hybrid" materials of the present invention are comprised of alumina and silica fibers in a ratio of 22:78.

Flexible composite hybrid compositions are provided comprising about 2 to 15 weight percent of a flexible monomer portion comprising one or more flexible co-monomers of the general formula $R^1$—O—[(CH—$R^2$)$_n$—O—]$_z$—$R^3$ wherein $R^1$ and $R^3$ are acrylate or functional groups, $R^2$ is selected from the group of hydrogen, methyl and ethyl, n is from 3 to 5 and z is from about 3 to about 20 and the monomers have average molecular weights from at least about 300 or higher; about 30 to about 80 weight percent of a filler portion; about 18 to 60 weight percent of a comonomer portion comprising one or more co-monomers capable of polymerizing with the flexible monomer portion; and a polymerization catalyst system for polymerizing and hardening the composition.

Suitable glass ionomer cements are generally comprised of a powder component containing aluminosilicate and a liquid portion. Often the liquid portion is expressed as containing polyacrylic acid, polymaleic acid, polyitaconic acid, or a copolymer of at least two of the acids. The liquid portion may also comprise carboxylate polymers or carboxylic acid polymeric structures, such as those including acrylic acid, maleic acid, crotonic acid, isocrotonic acid, methacrylic acid, sorbic acid, cinnamic acid, fumaric acids, and the like. In most glass ionomer cements, the primary reactions which cause the glass ionomer cement to harden is cross-linking, i.e., the cross-linking of polycarboxylate chains by metal ions from the glass. Also, during setting, the acids of the glass ionomer cement dissolve the glass structure to release metal constituents of the glass. Metal carboxylates are formed during the setting process. This may be distinguished from the primary setting reactions of acrylic cements which are other forms of polymerization reactions. Though other forms of polymerization reactions may occur in glass ionomer cements, these reactions are secondary to the cross-linking reactions of the glass ionomer cement.

Polyalkenoate cements, such as glass-ionomers and zinc polycarboxylate, are also suitable. "Hybrid" compositions according to the present invention comprise a reaction product between an aluminosilicate glass powder containing at least one element selected from Ca, Sr, and Ra and an organic acid containing one or more carboxyl groups in one molecule thereof; a methanol-insoluble polymer; a monomer containing at least one unsaturated double bond and having no acidic group; a polymerization initiator; and, optionally, a filler.

"Hybrid" composite materials may be characterized by a substrate and by a nano-composite which is in functional contact with the substrate and is obtainable by surface modification of colloidal inorganic particles with one or more silanes of the general formula (I) $R_x$—Si-$A_{4-x}$ where the radicals A are identical or different and are hydroxyl groups or groups which can be removed hydrolytically, except methoxy, the radicals R are identical or different and are groups which cannot be removed hydrolytically and x is 0, 1, 2 or 3, where x≧1 in at least 50 mol % of the silanes; under the conditions of the sol-gel process with a below-stoichiometric amount of water, based on the hydrolysable groups which are present, with formation of a nano-composite sol, and further hydrolysis and condensation of the nano-composite sol, if desired, before it is brought into contact with the substrate, followed by curing, said substrate not being a glass or mineral fiber or a vegetable material.

Ormocers, which can be obtained by the hydrolytic condensation of one or more silicon compounds, and the subsequent polymerization of organic monomers, wherein at least one silicon compound comprises vinyl ether radicals of formula:

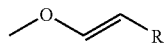

wherein R represents hydrogen, methyl, or ethyl, are also suitable. Low-viscosity "hybrid" materials containing a non-settling nano-scale filler are also suitable. The filler forms a stable sol with low-viscosity materials and the filler may be prepared by surface treatment of fillers having a primary particle size of from about 1 to about 100 nm.

Interwoven organic-inorganic solid composite materials are also suitable. These materials are formed of a mixture of a precursor polymer, an alcohol, and a catalyst system. The precursor polymer typically has an inorganic polymer backbone of Si or Ti with linkages to polymerizable alkoxide groups. The catalyst system promotes the hydrolysis and polymerization of the alkoxide groups and the condensation of the inorganic backbone to form a solid interwoven network with the organic polymer chains interpenetrating the network.

These "hybrid" materials and the nanoparticulates described herein are comtemplated for use in compositions for a variety of golf ball components including, but are not limited to, golf ball centers, cores, layers, covers, coatings, and, additionally, continuous or non-continuous layers such as those described in U.S. Pat. No. 6,494,795, which is incorporated herein, in its entirety, by express reference thereto.

Lipid-based nanotubules are also suitable nanomaterials for the compositions of the present invention. Lipid tubules are a self-organizing system in which surfactants crystallize into tightly packed bilayers that spontaneously form cylinders less than 100 nm in diameter. These novel cylindrical lipid structures, called nanotubules, can be used to entrap and release a variety of active compounds into surrounding materials. One embodiment of the invention is directed to the controlled release of desirable active agents or compounds, microencapsulated in nanotubules, by their dispersion in golf ball coatings, paints, adhesives, and component compositions. The tubules can be dispersed wet, aqueous or solvent-based, or dry, if robustness is required. Filled or unfilled nanotubules may also be used to adjust virgin material properties.

Suitable tubules include those formed by the self organization of polymerizable lipid-based molecules. The tubules are typically formed from diacetylinic phosphatidylcholine by several different techniques, such as heating the lipid above the phase transition temperature followed by slow cooling. Alternatively, the tubules can be formed by heating the lipid above the phase transition temperature, rapidly cooling the lipid to about 0° C., raising the temperature above the phase transition temperature a second time, and slowly cooling it to room temperature. Other additional methods of forming the nanotubules of the present invention are envisioned. Naturally occurring nanotubules, such as halloycite, are also suitable for the present invention.

Alternatively, the nanotubules may additionally contain a metal (on the inner and/or outer surfaces). The tubules can be metallized with any metal (or alloy thereof) capable of being plated. Metal tubules may be prepared by plating a metal on a filament which is soluble in a hydrocarbon solvent, to form an outer layer of metal, and then removing the central filament by exposure to a hydrocarbon solvent. Alternatively, a porous membrane may be plated with a metal to form a layer of metal on the inside surface of the pores, dissolution of the membrane, and collection of the metal tubules. Once coated with metal, the tubules are filtered to remove the solvent and are air dried to a powder form. At this point the tubules can be stirred into a coating, such as a paint or adhesive, by gentle agitation. If the tubules are processed to a wet stage and then solvent exchanged with a coating compatible solvent, the tubules can be mixed directly into a coating or composition with a diluent solvent.

A critical aspect of the tubules is, of course, their dimensions. Suitable inner diameters for range from about 50 nm to about 1000 nm, preferably from about 100 nm to about 900 nm, and most preferably from about 200 nm to about 800 nm. The inner diameter of the tubules and the desired time period of release may be controlled by varying the conditions used to produce the tubules. These include choice of active agent, carrier, environment surrounding the tubule, and other components of the composition (if the tubules are present in a composition). Generally, the diameter of the tubule will be 2 to 1,000 times the average diameter of the active agent or compound, preferably 20 to 500 times the average diameter. The nanotubules are not limited to those of any specific length. For any given tubule the time of effectiveness will increase with an increase in the length of the tubule.

Because of the tight packing of the surfactants in tubules, the microstructures should dissolve from their ends only. Since the size of the end (the only available surface area for removal of active agent) is constant until the tubule is annihilated, a population of tubules of uniform length will release surfactant at a constant rate. A controlled rate of release of a compound from a coating or polymer matrix can be achieved by creating a porous structure of controlled dimensions within a coating. The compound must migrate through the coating to reach the inner or outer environment or adjacent materials. This structure can be created by adding to a coating (or polymer composition) an effective amount of between about 5% and about 70% of nanotubules that contain or are composed of the desired active agent or compound.

The tubules, which act as nanovials or nanovessles, can be filled by a variety of techniques including capillary action. Compounds and active agents include UV absorbers, light stabilizers, bleaching agents, fluorophores, healing agents, and catalysts. Suitable UV absorbers and light stabilizers are described in U.S. application Ser. No. 10/627,504, the disclosure of which is incorporated herein, in its entirety, by express reference thereto. Suitable healing agents are described in U.S. Pat. No. 6,808,461, the disclosure of which is incorporated herein, in its entirety, by express reference thereto.

The rate of release of the compound as a function of area can be further controlled by the "loading" of the nanotubules, the concentration of the compound or agent contained in the tubules, the dimensions of the tubules, and solubility modifiers also contained within the nanotubules. The compound is chosen during the manufacture of the tubules, and its rate of release can be further modified during encapsulation by the addition of solubility modifiers such as glues, resins, polymers and other "slow release agents."

The hardness and ablation rate of a coating is controlled by the selection of the resins used as the coating vehicle. Vinyl-resin mixtures, acrylics, polyurethanes, and epoxies have been used successfully for this purpose. Further control of the coating properties and the release rates of the toxicants can be controlled by the orientation and distribution of the tubules by two methods. Orientation can be accomplished by coating the surface in the presence of a magnetic or electrical field which creates a preferred orientation of the tubules to the coated surface, either parallel or normal. In addition, in coatings where the film thickness is less than the average tubule length, the tubules can be oriented parallel to the surface.

Because of the aspect ratio and size of the tubules, the tubules can further act to form, within the coating, a network which adds improved physical characteristics. At the least the tubules extend down into the surface so that they are anchored in place. The ability to form a composite structure within the coating may provide enhanced structural properties not normally associated with the coating or composition within which the tubules are dispersed.

The present coatings and/or compositions (containing the nanotubules) may be applied to a surface by any conventional techniques. Thus, the coating compositions may be applied by roller, brush, or spray over a suitable primer or barrier coating, if necessary. The tubules are easily dispersed in paint and may be applied by means commonly used in the application of paint coatings. In addition, the tubules may be dried, and metal or metallized tubules can be oxidized. Such oxidized tubules can be charged and applied to oppositely charged surfaces by conventional powder coating technology. If the tubules are dispersed in a polymer blend or matrix, the composition may be further injection or compression molded, as desired. Additionally, the nanotubules may be dispersed in any of the reactants in a casting or reaction injection molding process.

A carrier is used to "fill" the tubules with the desired compound or active agent. The selection of the carrier is determined by the viscosity of the carrier and the solubility of the active agent in the carrier. The carrier must possess a sufficiently low viscosity so that it can fill the tubule as a result of capillary action.

If the agent is soluble or is mobile in the carrier, then the rate of release depends on the diffusion rate and solubility of the agent in the carrier and in the external matrix (if present). If the agent is insoluble or immobile in the carrier, then the rate of release depends on the rate of release of the carrier itself from the tubule.

In the present context, release means delivery of the agent to a surrounding matrix (e.g., in a coating composition). Accordingly, suitable carriers include low molecular weight polymers and monomers. Specific examples of such polymers include polysaccharides; polyesters; polyamides;

nylons; polypeptides; polyurethanes; polyureas, polyethylenes; polypropylenes; polyvinylchlorides; polystyrenes; polyphenols; polyvinyl pyrollidone; polyvinyl alcohol; ethylcellulose; gar gum; polyvinyl formal resin; water soluble epoxy resins; urea-formaldehyde; polylysine; chitosan; polyvinyl acetate and copolymers; and mixtures thereof.

Other uses for the nanotubules may include adhesion; thin-layer enforcement or stability; custom indicia or novel cover layers (i.e., metallized tubules blended with cover material, which, upon oxidation, form colored "swirls" or patterns); reactive identifiers (i.e., age, heat, moisture, impact frequency, etc.); inks; and dyes.

Methods and processes for forming selected microstructures having predetermined shape and dimension from surfactants are described in U.S. Pat. Nos. 4,877,501 and 4,990,291; methods necessary to coat tubular, spheroidal, and helical lipid microstructures with a range of metals are described in U.S. Pat. No. 4,911,981; and tubules are useful in the production of coating compositions for the protection of surfaces coming into contact with water, adhesive resins for the production of laminated wood products, and devices for dispensing pesticides are described in U.S. Pat. No. 6,280,759, all of which are incorporated herein, in their entirety, by express reference thereto.

In another embodiment, graphite nanosheets are used to form one or more inner cover layers, but the golf ball of the present invention may be formed with a variety of constructions. Graphite typically consists of a plurality of layered planes of hexagonal arrays or networks of carbon atoms. The layered planes of hexagonally arranged carbon atoms are substantially flat and are oriented substantially parallel to one another. The carbon atoms on a single layered plane are covalently bonded together, and the layered planes are bonded by substantially weaker van der Waals forces. Graphite is also an anisotropic structure, exhibits many properties that are highly directional, and possesses a high degree of orientation. Graphite includes natural graphite, Kish graphite and synthetic graphite. Graphite fillers are available commercially in powder form from Asbury Graphite, Inc. in Asbury, N.J. and Poco Graphite Inc, in Decatur, Tex.

In accordance with a first preferred embodiment of the present invention and as described in detail below, graphite is intercalated to insert atoms or molecules in the inter-planar spaces between the layered planes. The intercalated graphite is then expanded or exfoliated by sudden exposure to high heat to expand the inter-planar spacing between the layered planes. The exfoliated graphite is then mixed with suitable monomers and other additives prior to in situ polymerization to form nanosheets of graphite dispersed in a polymeric matrix. The polymeric matrix with graphite nanosheets dispersed therein may be formed into one or more layers of a golf ball, or it may be blended with other polymers described herein to form one or more layers of a golf ball.

A preferred method to intercalate graphite is immersing the graphite in a solution containing an oxidizing agent. Suitable oxidizing agents include solutions containing nitric acid, potassium chlorate, chromic acid, potassium permanganate, potassium chromate, potassium dichromate, perchloric acid and the like, or mixtures, such as concentrated nitric acid and chlorate, chromic acid and phosphoric acid, sulfuric acid and nitric acid, or mixtures of a strong organic acid, e.g., trifluoroacetic acid, and a strong oxidizing agent soluble in the organic acid.

Preferably, the intercalating agent is a solution containing a mixture of X/Y, wherein X can be sulfuric acid or sulfuric acid and phosphoric acid and Y is an oxidizing agent, such as nitric acid, perchloric acid, chromic acid, potassium permanganate, sodium nitrate, hydrogen peroxide, iodic or periodic acids. More preferably, the intercalating agent is a solution comprising about 80% by volume of sulfuric acid and 20% by volume of nitric acid. Preferably, the graphite is immersed in the sulfuric and nitric acid solution for up to 24 hours, or more. The resulting material, also known as graphite intercalated compound, comprises layered planes of carbon and intercalate layers stacked on top of one another in a periodic fashion. Typically, 1-5 layers of carbon can be present between adjacent intercalate layers. The preferred quantity of intercalated solution is from about 10 parts to about 150 parts of solution to 100 parts of graphite, more preferably from about 50 parts to about 120 parts to 100 parts of graphite.

Alternatively, the intercalating process can be achieved by other chemical treatments. For example, the intercalating agents may include a halogen, such as bromine, or a metal halide such as ferric chloride, aluminum chloride, or the like. A halogen, particularly bromine, may be intercalated by contacting graphite with bromine vapors, or with a solution of bromine in sulfuric acid, or with bromine dissolved in a suitable organic solvent. Metal halides can be intercalated by contacting the graphite with a suitable metal halide solution. For example, ferric chloride can be intercalated by contacting graphite with an aqueous solution of ferric chloride, or with a mixture of ferric chloride and sulfuric acid.

Other suitable intercalating agents include, but are not limited to, chromyl chloride, sulfur trioxide, antimony trichloride, chromium(III)chloride, iodine chloride, chromium(IV)oxide, gold(III)chloride, indium chloride, platinum(IV)chloride, chromyl fluoride, tantalum(V)chloride, samarium chloride, zirconium(IV)chloride, uranium chloride, and yttrium chloride.

The intercalated graphite is then washed with water until excess intercalating agent is washed from the graphite, or if acid is used until the washed water pH value is neutral. The graphite is then preferably heated to above the boiling point of the washed solution to evaporate the washed solution. Alternatively, to eliminate the post-intercalation washing step the amount of intercalated solution may be reduced to about 10 parts to about 50 parts per 100 parts of graphite as disclosed in U.S. Pat. No. 4,895,713, incorporated herein by reference.

To expand or exfoliate the inter-planar spacing between the layered planes, the intercalated graphite is exposed to very high heat in a relatively short amount of time. Without being bound by any particular theory, the exfoliated mechanism is the decomposition of the trapped intercalating agent, such as sulfuric and nitric acids ($H_2SO_4+HNO_3$), between the highly oriented layered planes when exposed to heat.

Suitable exfoliated processes include heating the intercalated graphite for a few seconds at temperatures of at least greater than 500° C., more preferably greater than 700° C., and more typically 1000° C. or more. The treated graphite typically expands in the "c" direction about 100 to more than 300 times the pre-treatment thickness. In one preferred exfoliating process, the intercalated graphite is exposed to temperature of about 1050° C. for about 15 seconds to achieve a thickness in the "c" direction of about 300 times of that in the pre-exfoliated graphite.

The exfoliated graphite is then mixed with a monomer and heated to the polymerization or vulcanization temperature to form a polymer with nanosheets of exfoliated graphite dispersed therein. The exfoliated graphite also reacts with the monomer to become a part of the structure of the polymer. It has also been shown that the nanosheets retained its structure in the polymer matrix, and that the monomer or polymer entered the gallery spacing between the nanosheets. It has also been determined that the dispersion of nanosheets of exfoliated graphite in the polymeric matrix improves the tensile strength of the polymer. This improved tensile strength of the polymer/graphite composite improves its impact strength.

The polymeric matrix can be any polymeric composition that is compatible with carbon. Suitable polymeric compositions include thermosetting polymers and thermoplastic polymers. More particularly, suitable polymeric compositions include polyethylene, polypropylene, acrylic and methacrylic polymers such as polymethyl methacrylate, polystyrene, polyepoxides or any polymer comprising an epoxy moiety, phenol-formaldehydes, polyamides, polyesters, polyvinyl chlorides, polycarbonates, polyacetals, polytetrafluoroethylene, polyvinylidene fluoride, polyurethanes, copolymers and blends of same and the like.

Suitable polymeric compositions also include, but not limited to, one or more of partially- or fully-neutralized ionomers including those neutralized by a metal ion source wherein the metal ion is the salt of an organic acid, polyolefins including polyethylene, polypropylene, polybutylene and copolymers thereof including polyethylene acrylic acid or methacrylic acid copolymers, or a terpolymer of ethylene, a softening acrylate class ester such as methyl acrylate, n-butyl-acrylate or iso-butyl-acrylate, and a carboxylic acid such as acrylic acid or methacrylic acid (e.g., terpolymers including polyethylene-methacrylic acid-n or iso-butyl acrylate and polyethylene-acrylic acid-methyl acrylate, polyethylene ethyl or methyl acrylate, polyethylene vinyl acetate, polyethylene glycidyl alkyl acrylates). Suitable polymers also include metallocene catalyzed polyolefins, polyesters, polyamides, non-ionomeric thermoplastic elastomers, copolyether-esters, copolyether-amides, thermoplastic or thermosetting polyurethanes, polyureas, polyurethane ionomers, epoxies, polycarbonates, polybutadiene, polyisoprene, and blends thereof. Suitable polymeric materials also include those listed in U.S. Pat. Nos. 5,919,100, 6,187,864, 6,232,400, 6,245,862, 6,290,611, 6,353,058, 6,204,331 and 6,142,887 and in PCT Publication Nos. WO 00/23519 and WO 01/29129, all incorporated herein. Ionomers, ionomer blends, thermosetting or thermoplastic polyurethanes, metallocenes are also suitable materials.

Most preferably, the polymer matrix materials include natural rubber, stryene-butadiene rubber, stryene-propylene or ethylene-diene block copolymer rubber, polyisoprene, polybutadiene, copolymers comprising ethylene or propylene such as ethylene-propylene rubber (EPR) or ethylene-propylene diene monomer (EPDM) elastomer, copolymers of acrylonitrile and a diene comprising elastomer (such as butadiene), polychloroprene and any copolymer including chloroprene, butyl rubber, halogenated butyl rubber, polysulfide rubber, silicone comprising polymers Exfoliated graphite may also be bonded with organic char materials, such as coal tar pitches, asphalts, phenol-formaldehyde, urea-formaldehyde, polyvinylidene chloride, polyacrylonitrile, sugars, and saccharides, inorganic glass bonding agents, such as boric oxide, silica, phosphorous, pentoxide, germanium oxide, vanadium pentoxide, and inorganic salts, such as beryllium fluoride, sulfates, chlorides and carbonates.

Alternatively, hydrogen peroxide can be blended with the intercalating agent, preferably sulfuric acid, and agitated until graphite-hydrogensulfate compound is formed. The compound is then removed from the intercalating solution and washed. The graphite-hydrogensulfate compound is exfoliated as described above to form the exfoliated compound. This compound has properties that are similar to the exfoliated graphite. Advantageously, the process of producing graphite-hydrogensulfate compound releases less pollutants into the environment. This method is described in U.S. Pat. No. 4,091,083, incorporated herein by reference.

Additionally, the nanosheets/polymeric matrix composite may be grounded or crushed and then mixed or blended with a second encasing polymeric material to produce a layer on the golf ball. Suitable polymeric materials for the polymeric matrix discussed above are also suitable to be second encasing material. Preferably, the polymeric matrix material is methyl methacrylate and the second encasing polymeric material is a polyurethane or a natural or synthetic rubber, preferably polybutadiene.

The nanomaterials can be blended with thermoplastics, thermoplastic elastomers, rubbers, and thermoset materials useful in making golf ball components. The nanoparticulates can be incorporated either during blending operation such as in single or twin-screw extruders or in rubber mixing equipment like brabender or internal mixers. Also, the nanoparticulates can be blended in a reactor during the polymerization of thermoplastic or thermoset or rubbery materials.

The materials for solid cores, which can be blended with the above nanoparticulates, typically include compositions having a base rubber, a crosslinking agent, a filler, and a co-crosslinking or initiator agent. The base rubber typically includes natural or synthetic rubbers. A preferred base rubber is 1,4-polybutadiene having a cis-structure of at least 40%. Most preferably, the base rubber comprises high-Mooney-viscosity rubber but it should be understood that rubbers having Mooney viscosity of any value are acceptable. Preferably, the base rubber has a Mooney viscosity of between about 30 and about 120. If desired, the polybutadiene can also be mixed with other elastomers known in the art such as natural rubber, polyisoprene rubber and/or styrene-butadiene rubber in order to modify the properties of the core.

The crosslinking agent includes a metal salt of an unsaturated fatty or non-fatty acid such as a zinc salt or a magnesium salt of an unsaturated fatty or non-fatty acid having 3 to 8 carbon atoms such as acrylic or methacrylic acid. Suitable cross linking agents include one or more metal salt diacrylates, dimethacrylates and monomethacrylates wherein the metal is magnesium, calcium, zinc, aluminum, sodium, lithium or nickel. Preferred acrylates include zinc acrylate, zinc diacrylate, zinc methacrylate, and zinc dimethacrylate, and mixtures thereof. The crosslinking agent is typically present in an amount greater than about 10 phr of the polymer component, preferably from about 10 to 40 phr of the polymer component, more preferably from about 10 to 30 phr of the polymer component.

The initiator agent can be any known polymerization initiator which decomposes during the cure cycle. Suitable initiators include peroxide compounds such as dicumyl peroxide, 1,1-di(t-butylperoxy) 3,3,5-trimethyl cyclohexane, a-a bis(t-butylperoxy) diisopropylbenzene, 2,5-dimethyl-2,5 di(t-butylperoxy) hexane or di-t-butyl peroxide and mixtures thereof.

Density-adjusting fillers typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like.

Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The invention also includes a method to convert the cis-isomer of the polybutadiene resilient polymer component to the trans-isomer during a molding cycle and to form a golf ball. A variety of methods and materials have been disclosed in U.S. Pat. No. 6,162,135 and U.S. application Ser. No. 09/461,736, filed Dec. 16, 1999; Ser. No. 09/458,676, filed Dec. 10, 1999; and Ser. No. 09/461,421, filed Dec. 16, 1999, each of which are incorporated herein, in their entirety, by reference.

The golf ball components, preferably centers and/or core layers, of the present invention may also be formed from, or include as a blend, highly-neutralized polymers ("HNP"). The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by organic fatty acids, or both. The second polymer component, which may be partially- or fully-neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment of the present invention the HNP's are ionomers and/or their acid precursors that are preferably neutralized, either filly or partially, with organic acid copolymers or the salts thereof. The acid copolymers are preferably α-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an α,β-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are, ethylene/(meth)acrylic acid/n-butyl, acrylate, ethylene/(meth)acrylic acid/ethyl acrylate, and ethylene/(meth)acrylic acid/methyl acrylate copolymers.

Ionomers are typically neutralized with a metal cation, such as Li, Na, Mg, or Zn. It has been found that by adding sufficient organic acid or salt of organic acid, along with a suitable base, to the acid copolymer or ionomer, however, the ionomer can be neutralized, without losing processability, to a level much greater than for a metal cation. Preferably, the acid moieties are neutralized greater than about 80%, preferably from 90-100%, most preferably 100%, without losing processability. This accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably 100%).

The organic acids of the present invention are aliphatic, mono- or multi-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The ionomers of the invention may also be partially neutralized with metal cations. The acid moiety in the acid copolymer is neutralized about 1 to about 100%, preferably at least about 40 to about 100%, and more preferably at least about 90 to about 100%, to form an ionomer by a cation such as lithium, sodium, potassium, magnesium, calcium, barium, lead, tin, zinc, aluminum, or a mixture thereof.

The acid copolymers are generally prepared from 'direct' acid copolymers, copolymers polymerized by adding all monomers simultaneously, or by grafting of at least one acid-containing monomer onto an existing polymer.

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

The copolyetheresters are comprised of a multiplicity of recurring long chain units and short chain units joined head-to-tail through ester linkages, the long chain units being represented by the formula:

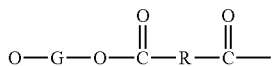

and the short chain units being represented by the formula:

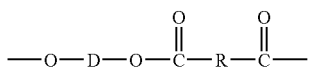

where G is a divalent radical remaining after the removal of terminal hydroxyl groups from a poly (alkylene oxide) glycol having a molecular weight of about 400-8000 and a carbon to oxygen ratio of about 2.0-4.3; R is a divalent radical remaining after removal of hydroxyl groups from a diol having a molecular weight less than about 250; provided said short chain ester units amount to about 15-95 percent by weight of said copolyetherester. The preferred copolyetherester polymers are those where the polyether segment is obtained by polymerization of tetrahydrofuran and the polyester segment is obtained by polymerization of tetramethylene glycol and phthalic acid. For purposes of the invention, the molar ether-ester ratio can vary from 90:10 to 10:80; preferably 80:20 to 60:40; and the Shore D hardness is less than 70; preferably less than about 40.

The copolyetheramides are comprised of a linear and regular chain of rigid polyamide segments and flexible polyether segments, as represented by the general formula:

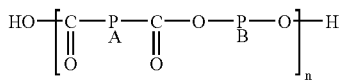

wherein PA is a linear saturated aliphatic polyamide sequence formed from a lactam or amino acid having a hydrocarbon chain containing 4 to 14 carbon atoms or from an aliphatic $C_6$-$C_8$ diamine, in the presence of a chain-limiting aliphatic carboxylic diacid having 4-20 carbon atoms; said polyamide having an average molecular weight between 300 and 15,000; and PB is a polyoxyalkylene sequence formed from linear or branched aliphatic polyoxyalkylene glycols, mixtures thereof or copolyethers derived therefrom, said polyoxyalkylene glycols having a molecular weight of less than or equal to 6000; and n indicates a sufficient number of repeating units so that said polyetheramide copolymer has an intrinsic viscosity of from about 0.6 to about 2.05. The preparation of these polyetheramides comprises the step of reacting a dicarboxylic polyamide, the COOH groups of which are located at the chain ends, with a polyoxyalkylene glycol hydroxylated at the chain ends, in the presence of a catalyst such as a tetra-alkyl ortho titanate having the general formula $Ti(OR)_x$ wherein R is a linear branched aliphatic hydrocarbon radical having 1 to 24 carbon atoms. Again, the more polyether units incorporated into the copolyetheramide, the softer the polymer. The ether:amide ratios are as described above for the ether:ester ratios, as is the Shore D hardness.

The elastomeric polyolefins are polymers composed of ethylene and higher primary olefins such as propylene, hexene, octene, and optionally 1,4-hexadiene and or ethylidene norbornene or norbomadiene. The elastomeric polyolefins can be optionally functionalized with maleic anhydride, epoxy, hydroxy, amine, carboxylic acid, sulfonic acid, or thiol groups.

Thermoplastic polyurethanes are linear or slightly chain branched polymers consisting of hard blocks and soft elastomeric blocks. They are produced by reacting soft hydroxy terminated elastomeric polyethers or polyesters with diisocyanates, such as methylene diisocyanate ("MDI"), p-phenylene diisocyanate ("PPDI"), or toluene diisocyanate ("TDI"). These polymers can be chain extended with glycols, secondary diamines, diacids, or amino alcohols. The reaction products of the isocyanates and the alcohols are called urethanes and these blocks are relatively hard and high melting. These hard high melting blocks are responsible for the thermoplastic nature of the polyurethanes.

Block styrene diene copolymers and their hydrogenated derivatives are composed of polystyrene units and polydiene units. They may also be functionalized with moieties such as OH, $NH_2$, epoxy, COOH, and anhydride groups. The polydiene units are derived from polybutadiene, polyisoprene units or copolymers of these two. In the case of the copolymer it is possible to hydrogenate the polyolefin to give a saturated rubbery backbone segments. These materials are usually referred to as SBS, SIS, or SEBS thermoplastic elastomers and they can also be functionalized with maleic anhydride.

Grafted metallocene-catalyzed polymers are also useful for blending with the HNP's. The grafted metallocene-catalyzed polymers, while conventionally neutralized with metal cations, may also be neutralized, either partially for fully, with organic acids or salts thereof and an appropriate base. Grafted metallocene-catalyzed polymers useful, such as those disclosed in U.S. Pat. Nos. 5,703,166; 5,824,746; 5,981,658; and 6,025,442, which are incorporated herein by reference, in the golf balls of the invention are available in experimental quantities from DuPont under the tradenames SURLYN® NMO 525D, SURLYN® NMO 524D, and SURLYN® NMO 499D, all formerly known as the FUSA-BOND® family of polymers, or may be obtained by subjecting a non-grafted metallocene-catalyzed polymer to a post-polymerization reaction to provide a grafted metallocene-catalyzed polymer with the desired pendant group or groups. Examples of metallocene-catalyzed polymers to which functional groups may be grafted for use in the invention include, but are not limited to, homopolymers of ethylene and copolymers of ethylene and a second olefin, preferably, propylene, butene, pentene, hexene, heptene, octene, and norbornene. Generally, the invention includes golf balls having at least one layer comprising at least one grafted metallocene-catalyzed polymer or polymer blend, where the grafted metallocene-catalyzed polymer is produced by grafting a functional group onto a metallocene-catalyzed polymer having the formula:

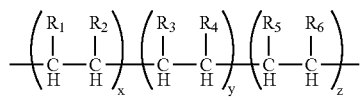

wherein $R_1$ is hydrogen, branched or straight chain alkyl such as methyl, ethyl, propyl, butyl, pentyl, hexyl, heptyl, and octyl, carbocyclic, or aromatic; $R_2$ is hydrogen, lower alkyl including $C_1$-$C_5$; carbocyclic, or aromatic; $R_3$ is hydrogen, lower alkyl including $C_1$-$C_5$, carbocyclic, or aromatic; $R_4$ is selected from the group consisting of H, $C_nH_{2n+1}$, where n=1 to 18, and phenyl, in which from 0 to 5 H within $R_4$ can be replaced by substituents COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring; $R_5$ is hydrogen, lower alkyl including $C_1$-$C_5$, carbocyclic, or aromatic; $R_6$ is hydrogen, lower alkyl including $C_1$-$C_5$, carbocyclic, or aromatic; and wherein x, y and z are the relative percentages of each co-monomer. X can range from about 1 to 99 percent or more preferably from about 10 to about 70 percent and most preferred, from about 10 to 50 percent. Y can be from 99 to 1 percent, preferably, from 90 to 30 percent, or most preferably, 90 to 50 percent. Z can range from about 0 to about 49 percent. One of ordinary skill in the art would understand that if an acid moiety is present as a ligand in the above polymer that it may be neutralized up to 100% with an organic fatty acid as described above.

Metallocene-catalyzed copolymers or terpolymers can be random or block and may be isotactic, syndiotactic, or atactic. The pendant groups creating the isotactic, syndiotactic, or atactic polymers are chosen to determine the interactions between the different polymer chains making up the resin to control the final properties of the resins used in golf ball covers, centers, or intermediate layers. As will be clear to those skilled in the art, grafted metallocene-catalyzed polymers useful in the invention that are formed from metallocene-catalyzed random or block copolymers or terpolymers will also be random or block copolymers or terpolymers, and will have the same tacticity of the metallocene-catalyzed polymer backbone.

As used herein, the term "phrase branched or straight chain alkyl" means any substituted or unsubstituted acyclic carbon-containing compounds. Examples of alkyl groups include lower alkyl, for example, methyl, ethyl, n-propyl, iso-propyl, n-butyl, iso-butyl or t-butyl; upper alkyl, for example, octyl, nonyl, decyl, and the like; and lower alkylene, for example, ethylene, propylene, butylene, pentene, hexene, octene, norbornene, nonene, decene, and the like.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, the term "substituted and unsubstituted carbocyclic" means cyclic carbon-containing compounds, including, but not limited to cyclopentyl, cyclohexyl, cycloheptyl, and the like. Such cyclic groups may also contain various substituents in which one or more hydrogen atoms has been replaced by a functional group. Such functional groups include those described above, and lower alkyl groups having from 1-28 carbon atoms. The cyclic groups of the invention may further comprise a heteroatom.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, and 2,2-methylphenylbutyl.

Non-grafted metallocene-catalyzed polymers useful in the present invention are commercially available under the trade name AFFINITY® polyolefin plastomers and ENGAGE® polyolefin elastomers commercially available from Dow Chemical Company and DuPont-Dow. Other commercially available metallocene-catalyzed polymers can be used, such as EXACT®, commercially available from Exxon and INSIGHT®, commercially available from Dow. The EXACT® and INSIGHT® line of polymers also have novel Theological behavior in addition to their other properties as a result of using a metallocene catalyst technology. Metallocene-catalyzed polymers are also readily available from Sentinel Products Corporation of Hyannis, Mass., as foamed sheets for compression molding.

Monomers useful in the present invention include, but are not limited to, olefinic monomers having, as a functional group, sulfonic acid, sulfonic acid derivatives, such as chlorosulfonic acid, vinyl ethers, vinyl esters, primary, secondary, and tertiary amines, mono-carboxylic acids, dicarboxylic acids, partially or fully ester-derivatized mono-carboxylic and dicarboxylic acids, anhydrides of dicarboxylic acids, and cyclic imides of dicarboxylic acids.

In addition, metallocene-catalyzed polymers may also be functionalized by sulfonation, carboxylation, or the addition of an amine or hydroxy group. Metallocene-catalyzed polymers functionalized by sulfonation, carboxylation, or the addition of a hydroxy group may be converted to anionic ionomers by treatment with a base. Similarly, metallocene-catalyzed polymers functionalized by the addition of an amine may be converted to cationic ionomers by treatment with an alkyl halide, acid, or acid derivative.

The most preferred monomer is maleic anhydride, which, once attached to the metallocene-catalyzed polymer by the post-polymerization reaction, may be further subjected to a reaction to form a grafted metallocene-catalyzed polymer containing other pendant or functional groups. For example, reaction with water will convert the anhydride to a dicarboxylic acid; reaction with ammonia, alkyl, or aromatic amine forms an amide; reaction with an alcohol results in the formation of an ester; and reaction with base results in the formation of an anionic ionomer.

The HNP's may also be blended with single-site and metallocene catalysts and polymers formed therefrom. As used herein, the term "single-site catalyst," such as those disclosed in U.S. Pat. No. 6,150,462 which is incorporated herein by reference, refers to a catalyst that contains an ancillary ligand that influences the stearic and electronic characteristics of the polymerizing site in a manner that prevents formation of secondary polymerizing species. The term "metallocene catalyst" refers to a single-site catalyst wherein the ancillary ligands are comprising substituted or unsubstituted cyclopentadienyl groups, and the term "non-metallocene catalyst" refers to a single-site catalyst other than a metallocene catalyst.

Non-metallocene single-site catalysts include, but are not limited to, the Brookhart catalyst, which has the following structure:

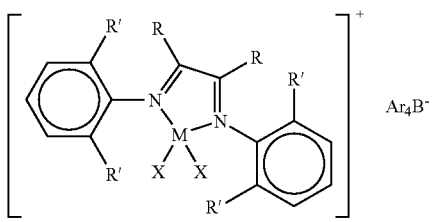

wherein M is nickel or palladium; R and R' are independently hydrogen, hydrocarbyl, or substituted hydrocarbyl; Ar is $(CF_3)_2C_6H_3$, and X is alkyl, methyl, hydride, or halide; the McConville catalyst, which has the structure:

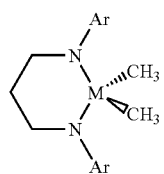

wherein M is titanium or zirconium. Iron (II) and cobalt (II) complexes with 2,6-bis(imino) pyridyl ligands, which have the structure:

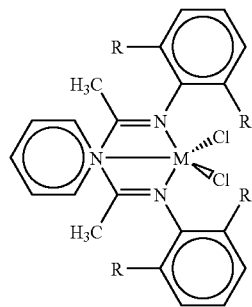

where M is the metal, and R is hydrogen, alkyl, or hydrocarbyl. Titanium or zirconium complexes with pyrroles as ligands also serve as single-site catalysts. These complexes have the structure:

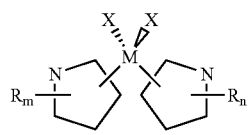

where M is the metal atom; m and n are independently 1 to 4, and indicate the number of substituent groups attached to the aromatic rings; $R_m$ and $R_n$ are independently hydrogen or alkyl; and X is halide or alkyl. Other examples include diimide complexes of nickel and palladium, which have the structure:

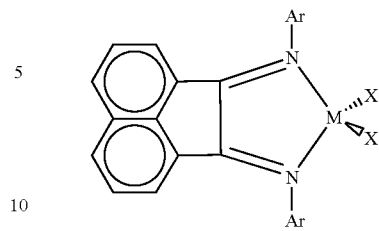

where Ar is aromatic, M is the metal, and X is halide or alkyl. Boratabenzene complexes of the Group IV or V metals also function as single-site catalysts. These complexes have the structure:

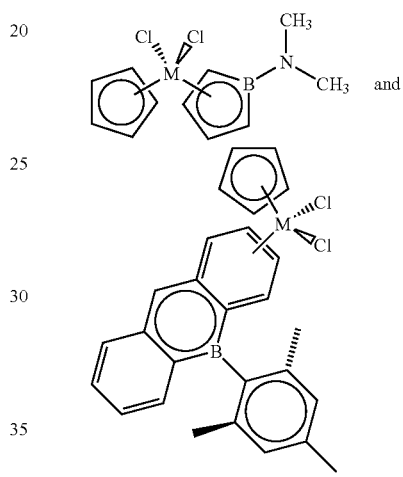

where B is boron and M is the metal atom.

As used herein, the term "single-site catalyzed polymer" refers to any polymer, copolymer, or terpolymer, and, in particular, any polyolefin polymerized using a single-site catalyst. The term "non-metallocene single-site catalyzed polymer" refers to any polymer, copolymer, or terpolymer, and, in particular, any polyolefin polymerized using a single-site catalyst other than a metallocene-catalyst. The catalysts discussed above are examples of non-metallocene single-site catalysts. The term "metallocene catalyzed polymer" refers to any polymer, copolymer, or terpolymer, and, in particular, any polyolefin, polymerized using a metallocene catalyst.

As used herein, the term "single-site catalyzed polymer blend" refers to any blend of a single-site catalyzed polymer and any other type of polymer, preferably an ionomer, as well as any blend of a single-site catalyzed polymer with another single-site catalyzed polymer, including, but not limited to, a metallocene-catalyzed polymer.

The terms "grafted single-site catalyzed polymer" and "grafted single-site catalyzed polymer blend" refer to any single-site catalyzed polymer or single-site catalyzed polymer blend in which the single-site catalyzed polymer has been subjected to a post-polymerization reaction to graft at least one functional group onto the single-site catalyzed polymer. A "post-polymerization reaction" is any reaction that occurs after the formation of the polymer by a polymerization reaction.

The single-site catalyzed polymer, which may be grafted, may also be blended with polymers, such as non-grafted single-site catalyzed polymers, grafted single-site catalyzed polymers, ionomers, and thermoplastic elastomers. Preferably, the single-site catalyzed polymer is blended with at least one ionomer of the preset invention.

Grafted single-site catalyzed polymers useful in the golf balls of the invention may be obtained by subjecting a non-grafted single-site catalyzed polymer to a post-polymerization reaction to provide a grafted single-site catalyzed polymer with the desired pendant group or groups. Examples of single-site catalyzed polymers to which functional groups may be grafted for use in the invention include, but are not limited to, homopolymers of ethylene and propylene and copolymers of ethylene and a second olefin, preferably, propylene, butene, pentene, hexene, heptene, octene, and norbornene. Monomers useful in the present invention include, but are not limited to olefinic monomers having as a functional group sulfonic acid, sulfonic acid derivatives, such as chlorosulfonic acid, vinyl ethers, vinyl esters, primary, secondary, and tertiary amines, epoxies, isocyanates, mono-carboxylic acids, dicarboxylic acids, partially or fully ester derivatized mono-carboxylic and dicarboxylic acids, anhydrides of dicarboxylic acids, and cyclic imides of dicarboxylic acids. Generally, this embodiment of the invention includes golf balls having at least one layer comprising at least one grafted single-site catalyzed polymer or polymer blend, where the grafted single-site catalyzed polymer is produced by grafting a functional group onto a single-site catalyzed polymer having the formula:

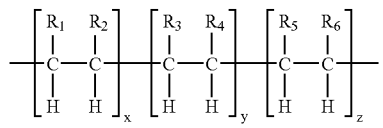

where $R_1$ is hydrogen, branched or straight chain alkyl such as methyl, ethyl, propyl, butyl, pentyl, hexyl, heptyl, and octyl, carbocyclic, aromatic or heterocyclic; $R_2$, $R_3$, $R_5$, and $R_6$ are hydrogen, lower alkyl including $C_1$-$C_5$, carbocyclic, aromatic or heterocyclic; $R_4$ is H, $C_nH_{2n+1}$, where n=1 to 18, and phenyl, in which from 0 to 5 H within $R_4$ can be replaced by substituents such as COOH, $SO_3H$, $NH_2$, F, Cl, Br, I, OH, SH, epoxy, isocyanate, silicone, lower alkyl esters and lower alkyl ethers; also, $R_3$ and $R_4$ can be combined to form a bicyclic ring; and x, y and z are the relative percentages of each co-monomer. X can range from about 1 to about 100 percent or more preferably from 1 to 70 percent and most preferred, from about 1 to about 50 percent. Y can be from about 99 to about 0 percent, preferably, from about 9 to about 30 percent, or most preferably, about 9 to about 50 percent. Z can range from about 0 to about 50 percent. One of ordinary skill in the art would also understand that if an acid group is selected as a ligand in the above structure that it too could be neutralized with the organic fatty acids described above.

The HNP's of the present invention may also be blended with high crystalline acid copolymers and their ionomer derivatives (which may be neutralized with conventional metal cations or the organic fatty acids and salts thereof) or a blend of a high crystalline acid copolymer and its ionomer derivatives and at least one additional material, preferably an acid copolymer and its ionomer derivatives. As used herein, the term "high crystalline acid copolymer" is defined as a "product-by-process" in which an acid copolymer or its ionomer derivatives formed from a ethylene/carboxylic acid copolymer comprising about 5 to about 35 percent by weight acrylic or methacrylic acid, wherein the copolymer is polymerized at a temperature of about 130° C. to 200° C., at pressures greater than about 20,000 psi preferably greater than about 25,000 psi, more pref. from about 25,000 psi to about 50,000 psi, wherein up to about 70 percent, preferably 100 percent, of the acid groups are neutralized with a metal ion, organic fatty acids and salts thereof, or a mixture thereof. The copolymer can have a melt index ("MI") of from about 20 to about 300 g/10 min, preferably about 20 to about 200 g/10 min, and upon neutralization of the copolymer, the resulting acid copolymer and its ionomer derivatives should have an MI of from about 0.1 to about 30.0 g/10 min.

Suitable high crystalline acid copolymer and its ionomer derivatives compositions and methods for making them are disclosed in U.S. Pat. No. 5,580,927, the disclosure of which is hereby incorporated by reference in its entirety.

The high crystalline acid copolymer or its ionomer derivatives employed in the present invention are preferably formed from a copolymer containing about 5 to about 35 percent, more preferably from about 9 to about 18, most preferably about 10 to about 13 percent, by weight of acrylic acid, wherein up to about 75 percent, most preferably about 60 percent, of the acid groups are neutralized with an organic fatty acid, salt thereof, or a metal ion, such as sodium, lithium, magnesium, or zinc ion.

Generally speaking, high crystalline acid copolymer and its ionomer derivatives are formed by polymerization of their base copolymers at lower temperatures, but at equivalent pressures to those used for forming a conventional acid copolymer and its ionomer derivatives. Conventional acid copolymers are typically polymerized at a polymerization temperature of from at least about 200° C. to about 270° C., preferably about 220° C., and at pressures of from about 23,000 to about 30,000 psi. In comparison, the high crystalline acid copolymer and its ionomer derivatives employed in the present invention are produced from acid copolymers that are polymerized at a polymerization temperature of less than 200° C., and preferably from about 130° C. to about 200° C., and at pressures from about 20,000 to about 50,000 psi.

The HNP's may also be blended with cationic ionomers, such as those disclosed in U.S. Pat. No. 6,193,619 which is incorporated herein by reference. In particular, cationic ionomers have a structure according to the formula:

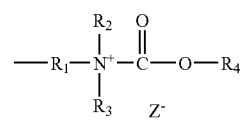

or the formula:

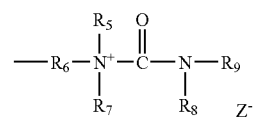

wherein $R_1$-$R_9$ are organic moieties of linear or branched chain alkyl, carbocyclic, or aryl; and Z is the negatively charged conjugate ion produced following alkylation and/or quaternization. The cationic polymers may also be quaternized up to 100% by the organic fatty acids described above.

In addition, such alkyl group may also contain various substituents in which one or more hydrogen atoms has been replaced by a functional group. Functional groups include but are not limited to hydroxyl, amino, carboxyl, amide, ester, ether, sulfonic, siloxane, siloxyl, silanes, sulfonyl, and halogen.

As used herein, substituted and unsubstituted carbocyclic groups of up to about 20 carbon atoms means cyclic carbon-containing compounds, including but not limited to cyclopentyl, cyclohexyl, cycloheptyl, and the like. Such cyclic groups may also contain various substituents in which one or more hydrogen atoms has been replaced by a functional group. Such functional groups include those described above, and lower alkyl groups as described above. The cyclic groups of the invention may further comprise a heteroatom.

The HNP's may also be blended with polyurethane and polyurea ionomers which include anionic moieties or groups, such as those disclosed in U.S. Pat. No. 6,207,784 which is incorporated herein by reference. Typically, such groups are incorporated onto the diisocyanate or diisocyanate component of the polyurethane or polyurea ionomers. The anionic group can also be attached to the polyol or amine component of the polyurethane or polyurea, respectively. Preferably, the anionic group is based on a sulfonic, carboxylic or phosphoric acid group. Also, more than one type of anionic group can be incorporated into the polyurethane or polyurea. Examples of anionic polyurethane ionomers with anionic groups attached to the diisocyanate moiety can have a chemical structure according to the following formula:

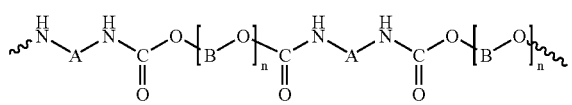

where $A=R-Z^-M^{+x}$; R is a straight chain or branched aliphatic group, a substituted straight chain or branched aliphatic group, or an aromatic or substituted aromatic group; $Z=SO_3^-$, $CO_2^-$ or $HPO_3^-$; M is a group IA, IB, IIA, IIB, IIIA, IIIB, IVA, IVB, VA, VB, VIA, VIB, VIIB or VIIIB metal; x=1 to 5; B is a straight chain or branched aliphatic group, a substituted straight chain or branched aliphatic group, or an aromatic or substituted aromatic group; and n=1 to 100. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$ or $Hf^{+x}$.

Exemplary anionic polyurethane ionomers with anionic groups attached to the polyol component of the polyurethane are characterized by the above chemical structure where A is a straight chain or branched aliphatic group, a substituted straight chain or branched aliphatic group, or an aromatic or substituted aromatic group; $B=R-Z^-M^{+x}$; R is a straight chain or branched aliphatic group, a substituted straight chain or branched aliphatic group, or an aromatic or substituted aromatic group; $Z=SO_3^-$, $CO_2^-$ or $HPO_3^-$; M is a group IA, IB, IIA, IIB, IIIA, IIIB, IVA, IVB, VA, VB, VIA, VIB, VIIB or VIIIB metal; x=1 to 5; and n=1 to 100. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$ or $Hf^{+x}$.

Examples of suitable anionic polyurea ionomers with anionic groups attached to the diisocyanate component have a chemical structure according to the following chemical structure:

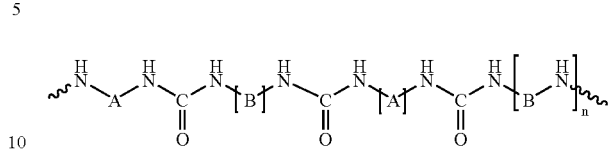

where $A=R-Z^-M^{+x}$; R is a straight chain or branched aliphatic group, a substituted straight chain or branched aliphatic group, or an aromatic or substituted aromatic group; $Z=SO_3^-$, $CO_2^-$ or $HPO_3^-$; M is a group IA, IB, IIA, IIB, IIIA, IIIB, IVA, IVB, VA, VB, VIA, VIB, VIIB or VIIIB metal; x=1 to 5; and B is a straight chain or branched aliphatic group, a substituted straight chain or branched aliphatic group, or an aromatic or substituted aromatic group. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$ or $Hf^{+x}$.

Suitable anionic polyurea ionomers with anionic groups attached to the amine component of the polyurea are characterized by the above chemical structure where A is a straight chain or branched aliphatic group, a substituted straight chain or branched aliphatic group, or an aromatic or substituted aromatic group; $B=R-Z^-M^{+x}$; R is a straight chain or branched aliphatic group, a substituted straight chain or branched aliphatic group, or an aromatic or substituted aromatic group; $Z=SO_3^-$, $CO_2^-$, or $HPO_3^-$; M is a group IA, IB, IIA, IIB, IIIA, IIIB, IVA, IVB, VA, VB, VIA, VIB, VIIB or VIIIB metal; and x=1 to 5. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$, or $Hf^{+x}$. The anionic polyurethane and polyurea ionomers may also be neutralized up to 100% by the organic fatty acids described above.

The anionic polymers useful in the present invention, such as those disclosed in U.S. Pat. No. 6,221,960 which is incorporated herein by reference, include any homopolymer, copolymer or terpolymer having neutralizable hydroxyl and/or dealkylable ether groups, and in which at least a portion of the neutralizable or dealkylable groups are neutralized or dealkylated with a metal ion.

As used herein "neutralizable" or "dealkylable" groups refer to a hydroxyl or ether group pendent from the polymer chain and capable of being neutralized or dealkylated by a metal ion, preferably a metal ion base. These neutralized polymers have improved properties critical to golf ball performance, such as resiliency, impact strength and toughness and abrasion resistance. Suitable metal bases are ionic compounds comprising a metal cation and a basic anion. Examples of such bases include hydroxides, carbonates, acetates, oxides, sulfides, and the like.

The particular base to be used depends upon the nature of the hydroxyl or ether compound to be neutralized or dealkylated, and is readily determined by one skilled in the art. Preferred anionic bases include hydroxides, carbonates, oxides and acetates.

The metal ion can be any metal ion which forms an ionic compound with the anionic base. The metal is not particularly limited, and includes alkali metals, preferably lithium, sodium or potassium; alkaline earth metals, preferably magnesium or calcium; transition metals, preferably titanium, zirconium, or zinc; and Group III and IV metals. The metal ion can have a +1 to +5 charge. Most preferably, the metal is lithium, sodium, potassium, zinc, magnesium, titanium, tungsten, or calcium, and the base is hydroxide, carbonate or acetate.

The anionic polymers useful in the present invention include those which contain neutralizable hydroxyl and/or dealkylable ether groups. Exemplary polymers include ethylene vinyl alcohol copolymers, polyvinyl alcohol, polyvinyl acetate, poly(p-hydroxymethylene styrene), and p-methoxy styrene, to name but a few. It will be apparent to one skilled in the art that many such polymers exist and thus can be used in the compositions of the invention. In general, the anionic polymer can be described by the chemical structure:

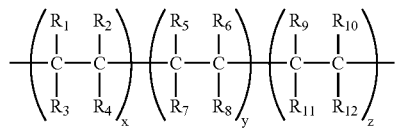

where $R_1$ is OH, $OC(O)R_a$, $O-M^{+V}$, $(CH_2)_n R_b$, $(CHR_z)_n R_b$, or aryl, wherein n is at least 1, $R_a$ is a lower alkyl, M is a metal ion, V is an integer from 1 to 5, $R_b$ is OH, $OC(O)R_a$, $O-M^{+V}$, and $R_z$ is a lower alkyl or aryl, and $R_2$, $R_3$ and $R_4$ are each independently hydrogen, straight-chain or branched-chain lower alkyl. $R_2$, $R_3$ and $R_4$ may also be similarly substituted. Preferably n is from 1 to 12, more preferably 1 to 4.

The term "substituted," as used herein, means one or more hydrogen atoms has been replaced by a functional group. Functional groups include, but are not limited to, hydroxyl, amino, carboxyl, sulfonic, amide, ether, ether, phosphates, thiol, nitro, silane, and halogen, as well as many others which are quite familiar to those of ordinary skill in this art.

The terms "alkyl" or "lower alkyl," as used herein, includes a group of from about 1 to 30 carbon atoms, preferably 1 to 10 carbon atoms.

In the anionic polymers useful in the present invention, at least a portion of the neutralizable or dealkylable groups of $R_1$ are neutralized or dealkylated by an organic fatty acid, a salt thereof, a metal base, or a mixture thereof to form the corresponding anionic moiety. The portion of the neutralizable or dealkylable groups which are neutralized or dealkylated can be between about 1 to about 100 weight percent, preferably between about 50 to about 100 weight percent, more preferably before about 90 to about 100.

Neutralization or dealkylation may be performed by melting the polymer first, then adding a metal ion in an extruder. The degree of neutralization or dealkylation is controlled by varying the amount of metal ion added. Any method of neutralization or dealkylation available to those of ordinary skill in the art may also be suitably employed.

In one embodiment, the anionic polymer is repeating units any one of the three homopolymer units in the chemical structure above. In a preferred embodiment, $R_2$, $R_3$ and $R_4$ are hydrogen, and $R_1$ is hydroxyl, i.e., the anionic polymer is a polyvinyl alcohol homopolymer in which a portion of the hydroxyl groups have been neutralized with a metal base. In another preferred embodiment, $R_2$, $R_3$ and $R_4$ are hydrogen, $R_1$ is $OC(O)R_a$, and $R_a$ is methyl, i.e., the anionic polymer is a polyvinyl acetate homopolymer in which a portion of the methyl ether groups have been dealkylated with a metal ion.

The anionic polymer can also be a copolymer of two different repeating units having different substituents, or a terpolymer of three different repeating units described in the above formula. In this embodiment, the polymer can be a random copolymer, an alternating copolymer, or a block copolymer, where the term "copolymer" includes terpolymers.

In another embodiment, the anionic polymer is a copolymer, wherein $R_5$, $R_6$, $R_7$ and $R_8$ are each independently selected from the group defined above for $R_2$. The first unit of the copolymer can comprise from about 1 to 99 percent weight percent of the polymer, preferably from about 5 to 50 weight percent, and the second unit of the copolymer can comprise from about 99 to 1 weight percent, preferably from about 95 to 50 weight percent. In one preferred embodiment, the anionic polymer is a random, alternating or block copolymer of units (Ia) and (Ib) wherein $R_1$ is hydroxyl, and each of the remaining R groups is hydrogen, i.e., the polymer is a copolymer of ethylene and vinyl alcohol. In another preferred embodiment, the anionic polymer is a random, alternating or block copolymer of units (Ia) and (Ib) wherein $R_1$ is $OC(O)R_5$, where $R_5$ is methyl, and each of the remaining R groups is hydrogen, i.e., the polymer is a copolymer of ethylene and vinyl acetate.

In another embodiment, the anionic polymer is an anionic polymer having neutralizable hydroxyl and/or dealkylable ether groups of as in the above chemical structure wherein $R_{1-9}$ and $R_b$ and $R_z$ are as defined above; $R_{10-11}$ are each independently selected from the group as defined above for $R_2$; and $R_{12}$ is OH or $OC(O)R_{13}$, where $R_{13}$ is a lower alkyl; wherein x, y and z indicate relative weight percent of the different units. X can be from about 99 to about 50 weight percent of the polymer, y can be from about 1 to about 50 weight percent of the polymer, and z ranges from about 0 to about 50 weight percent of the polymer. At least a portion of the neutralizable groups $R_1$ are neutralized. When the amount of z is greater than zero, a portion of the groups $R_{10}$ can also be fully or partially neutralized, as desired.

In particular, the anionic polymers and blends thereof can comprise compatible blends of anionic polymers and ionomers, such as the ionomers described above, and ethylene acrylic methacrylic acid ionomers, and their terpolymers, sold commercially under the trade names SURLYN® and IOTEK® by DuPont and Exxon respectively. The anionic polymer blends useful in the golf balls of the invention can also include other polymers, such as polyvinylalcohol, copolymers of ethylene and vinyl alcohol, poly(ethylethylene), poly(heptylethylene), poly(hexyldecylethylene), poly(isopentylethylene), poly(butyl acrylate), acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly(pentyloxyethylene), poly(1,1-dichloroethylene), poly(4-[(2-butoxyethoxy)methyl]styrene), poly[oxy(ethoxymethyl)ethylene], poly(oxyethylethylene), poly(oxytetramethylene), poly(oxytrimethylene), poly(silanes) and poly(silazanes), polyamides, polycarbonates, polyesters, styrene block copolymers, polyetheramides, polyurethanes, main-chain heterocyclic polymers and poly(furan tetracarboxylic acid diimides), as well as the classes of polymers to which they belong.

The anionic polymer compositions typically have a flexural modulus of from about 500 psi to about 300,000 psi, preferably from about 2000 to about 200,000 psi. The anionic polymer compositions typically have a material hardness of at least about 15 Shore A, preferably between about 30 Shore A and 80 Shore D, more preferably between about 50 Shore A and 60 Shore D. The loss tangent, or dissipation factor, is a ratio of the loss modulus over the dynamic shear storage modulus, and is typically less than about 1, preferably less than about 0.01, and more preferably less than about 0.001 for the anionic polymer compositions measured at about 23° C. The specific gravity is typically greater than about 0.7, preferably greater than about 1, for the anionic polymer compositions. The dynamic shear storage modulus, or storage modulus, of the anionic polymer compositions at about 23° C. is typically at least about 10,000 dyn/cm$^2$.

The materials used in forming either the golf ball center or any portion of the core, in accordance with the invention, may be combined to form a mixture by any type of mixing known to one of ordinary skill in the art. Suitable types of mixing include single pass and multi-pass mixing. Suitable mixing equipment is well known to those of ordinary skill in the art, and such equipment may include a Banbury mixer, a two-roll mill, or a twin screw extruder.

Conventional mixing speeds for combining polymers are typically used. The mixing temperature depends upon the type of polymer components, and more importantly, on the type of free-radical initiator. Suitable mixing speeds and temperatures are well-known to those of ordinary skill in the art, or may be readily determined without undue experimentation. The mixture can be subjected to, e.g., a compression or injection molding process, to obtain solid spheres for the center or hemispherical shells for forming an intermediate layer. The temperature and duration of the molding cycle are selected based upon reactivity of the mixture. The molding cycle may have a single step of molding the mixture at a single temperature for a fixed time duration. The molding cycle may also include a two-step process, in which the polymer mixture is held in the mold at an initial temperature for an initial duration of time, followed by holding at a second, typically higher temperature for a second duration of time. In a preferred embodiment of the current invention, a single-step cure cycle is employed. The materials used in forming either the golf ball center or any portion of the core, in accordance with the invention, may be combined to form a golf ball by an injection molding process, which is also well-known to one of ordinary skill in the art. Although the curing time depends on the various materials selected, those of ordinary skill in the art will be readily able to adjust the curing time upward or downward based on the particular materials used and the discussion herein.

Thermoplastic resins and rubbers for use as the matrix polymer and/or as an intercalant polymer, in the practice of this invention may vary widely. Illustrative of useful thermoplastic resins, which may be used alone or in admixture, include, but are not limited to, polylactones such as poly (pivalolactone), poly(caprolactone) and the like; polyurethanes derived from reaction of diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane, and the like.

Also suitable are linear long-chain diols such as poly (tetramethylene adipate), poly(ethylene adipate), poly(1,4-butylene adipate), poly(ethylene succinate), poly(2,3-butylene succinate), polyether diols and the like; polycarbonates such as poly [methane bis(4-phenyl)carbonate], poly[1,1-ether bis(4-phenyl)carbonate], poly[diphenylmethane bis(4-phenyl)carbonate], poly[1,1-cyclohexane bis(4-phenyl)carbonate] and the like; polysulfones; polyethers; polyketones; polyamides such as poly(4-amino butyric acid), poly(hexamethylene adipamide), poly(6-aminohexanoic acid), poly (m-xylylene adipamide), poly(p-xylylene sebacamide), poly (2,2,2-trimethyl hexamethylene terephthalamide), poly(m-phenylene isophthalamide) (NOMEX®), poly(p-phenylene terephthalamide) (KEVLAR®), and the like; polyesters such as poly(ethylene azelate), poly(ethylene-1,5-naphthalate, poly(1,4-cyclohexane dimethylene terephthalate), poly (ethylene oxybenzoate) (A-TELL®), poly(p-hydroxy benzoate) (EKONOL®), poly(1,4-cyclohexylidene dimethylene terephthalate) (KODEL®), poly(1,4-cyclohexylidene dimethylene terephthalate) (KODEL®), polyethylene terephthalate, polybutylene terephthalate, polytrimethylene terephtalate ("PTT"), and the like; poly(arylene oxides) such as poly(2,6-dimethyl-1,4-phenylene oxide), poly(2,6-diphenyl-1,4-phenylene oxide) and the like; poly (arylene sulfides) such as poly(phenylene sulfide), and the like.

Further suitable polymers include, but are not limited to polyetherimides; vinyl polymers and their copolymers such as polyvinyl acetate, polyvinyl alcohol, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers, and the like; polyolefins such as low density poly(ethylene), poly (propylene), chlorinated low density poly(ethylene), poly(4-methyl-1-pentene), poly(ethylene), poly(styrene), and the like; ionomers; poly(epichlorohydrins); and polysulfones, such as the reaction product of the sodium salt of 2,2-bis (4-hydroxyphenyl)propane and 4,4'-dichlorodiphenyl sulfone; furan resins, such as poly(furan); cellulose ester plastics, such as cellulose acetate, cellulose acetate butyrate, cellulose propionate, and the like; silicones such as poly (dimethyl siloxane), poly(dimethyl siloxane), poly(dimethyl siloxane co-phenylmethyl siloxane), and the like; protein plastics; and blends of two or more of the foregoing.

Preferably, the nanomaterials can be blended with materials such as ionomers, copolyether-ester, copolyester-ester, copolyether-amide, copolyester-amide, thermoplastic urethanes, metallocene or single-site non-metallocene catalyzed polymers, polyamides, liquid crystal polymers, as well as other polymers mentioned in U.S. Pat. No. 6,124,389; U.S. Pat. No. 6,025,442; and U.S. Pat. No. 6,001,930, the disclosure of which are incorporated herein, in their entirety, by express reference thereto.

Vulcanizable and thermoplastic rubbers useful as the matrix polymer and/or as a water insoluble intercalant polymer, in the practice of this invention may also vary widely. Examples include but are not limited to, brominated butyl rubber, chlorinate butyl rubber, polyurethane elastomers, fluoroelastomers, polyester elastomers, polyvinylchloride, butadiene/acrylonitrile elastomers, silicone elastomers, poly(butadiene), poly(isoprene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly (butadiene-pentadiene), chlorosulphonated poly(ethylenes), poly(sulfide) elastomers, block copolymers made up of segments of glassy or crystalline blocks such as poly(styrene), poly(vinyltoluene), poly(t-butyl styrene), polyesters and the like and the elastomeric blocks such as poly(butadiene), poly(isoprene), ethylene-propylene copolymers, ethylene-butylene copolymers, polyether and the like as for example the copolymers in poly(styrene)-poly(butadiene)-poly(styrene) block copolymer manufactured by Shell Chemical Company of Houston, Tex., under the trade name KRATON®.

Useful thermosetting resins include, but are not limited to, polyamides; polyalkylamides; polyesters; polyurethanes; polycarbonates; polyepoxides; and mixtures thereof. Thermoset resins based on water-soluble prepolymers, include prepolymers based on formaldehyde: phenols (phenol, cresol and the like); urea; melamine; melamine and phenol; urea and phenol. Polyurethanes based on: toluene diisocyanate ("TDI") and monomeric and polymeric diphenyl methanediisocyanates ("MDI"), p-phenylenediisocynate ("PPDI"); hydroxy terminated polyethers (polyethylene glycol, polypropylene glycol, copolymers of ethylene oxide and propylene oxide and the like); amino terminated polyethers, polyamines (tetramethylene diamine, ethylenediamine, hexamethylenediamine, 2,2-dimethyl 1,3-propanediamine; melamine, diaminobenzene, triaminobenzene and the like); polyamidoamines (for instance, hydroxy terminated polyesters); unsaturated polyesters based on maleic and fumaric anhydrides and acids; glycols (ethylene, propylene), polyethylene glycols, polypropylene glycols, aromatic glycols and polyglycols; unsaturated polyesters based on vinyl, allyl and acryl monomers; epoxides, based on biphenol A (2,2'-bis(4-hydroxyphenyl)propane) and epichlorohydrin; epoxy prepolymers based on monoepoxy and polyepoxy compounds and α,β-unsaturated compounds (styrene, vinyl, allyl, acrylic monomers); polyamides 4-tetramethylene diamine, hexamethylene diamine, melamine, 1,3-propanediamine, diaminobenzene, triaminobenzene, 3,3',4,4'-bitriaminobenzene; 3,3',4,4'-biphenyltetramine and the like).

Also suitable are polyethyleneimines; amides and polyamides (amides of di-, tri-, and tetra acids); hydroxyphenols (pyrogallol, gallic acid, tetrahydroxybenzophenone, tetrahydroquinone, catechol, phenol and the like); anhydrides and polyandrides of di-, tri-, and tetraacids; polyisocyanurates based on TDI and MDI; polyimides based on pyromellitic dianhydride and 1,4-phenyldiamine; polybenzimidozoles based on 3 3',4 4'-biphenyltetramine and isophthalic acid; polyamide based on unsaturated dibasic acids and anhydrides (maleic, fumaric) and aromatic polyamides; alkyd resins based on dibasic aromatic acids or anhydrides, glycerol, trimethylolpropane, pentaerythritol, sorbitol and unsaturated fatty long chain carboxylic acids (the latter derived from vegetable oils); and prepolymers based on acrylic monomers (hydroxy or carboxy functional).

In addition, the nanoparticulates can be incorporated in the polyurethane, polyurea and epoxy and their ionomeric derivatives and IPN polymers that are known in the golf ball compositions. This can be achieved by various processes like casting, reaction injection molding and other process that are well known in the art. Further, the nanomaterials can also be used in ink and paint formulations to improve its mechanical properties and abrasion resistant. The nanomaterials can be present any where between about 0.5 and about 20 weight percent in the compositions of the present invention.

In a preferred embodiment of the present invention, the polymer composition, typically a polybutadiene rubber based rubber composition, comprises nanoparticulate zinc oxide, which has an average particle diameter of less than 100 nm. Conventional ZnO ranges in size from about 1 μm to about 50 μm. Without wishing to be bound by any particular theory it is believed that the smaller particle size of the nanoparticulate ZnO, which has a much larger active surface area than does convention ZnO, allows the ZnO nanoparticles to "participate" more intricately in the formation and development of the polybutadiene properties. An example of nanoparticulate ZnO includes NANOX®, which is commercially available from Elementis of Gent, Belgium. Other non-reacting, high-specific nanoparticulates that are suitable for the blends of the present invention include tungsten, tungsten trioxide, tungsten carbide, bismuth trioxide, tin oxide, nickel, aluminum oxide, iron oxide, and mixtures thereof.

The cover provides the interface between the ball and a club. Properties that are desirable for the cover include good moldability, high abrasion resistance, high tear strength, high resilience, and good mold release. The cover typically has a thickness to provide sufficient strength, good performance characteristics, and durability. The cover preferably has a thickness of less than about 0.1 inches, preferably, less than about 0.05 inches, more preferably, between about 0.02 inches and about 0.04 inches, and most preferably, between about 0.025 and about 0.035 inches. The invention is particularly directed towards a multilayer golf ball which comprises a core, an inner cover layer, and an outer cover layer. In this embodiment, preferably, at least one of the inner and outer cover layer has a thickness of less than about 0.05 inches, more preferably between about 0.02 inches and about 0.04 inches. Most preferably, the thickness of either layer is about 0.03 inches.

When the golf ball of the present invention includes an intermediate layer, such as an outer core layer or an inner cover layer, any or all of these layer(s) may comprise thermoplastic and thermosetting material, but preferably the intermediate layer(s), if present, comprise any suitable material, such as ionic copolymers of ethylene and an unsaturated monocarboxylic acid which are available under the trademark SURLYN® of E.I. DuPont de Nemours & Co., of Wilmington, Del., or IOTEK® or ESCOR® of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

The golf balls of the present invention can likewise include one or more homopolymeric or copolymeric inner or outer cover materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates, in particular PPDI-based thermoplastic polyurethanes, and those disclosed in U.S. Pat. No. 5,334,673;

(4) Polyureas, such as those disclosed in U.S. Pat. No. 5,484,870;
(5) Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethylene-propylene-non-conjugated diene terpolymer, and the like;
(6) Acrylic resins and blends of these resins with poly vinyl chloride, elastomers, and the like;
(7) Thermoplastics, such as urethane; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.;
(8) Polyphenylene oxide resins or blends of polyphenylene oxide with high impact polystyrene as sold under the trademark NORYL® by General Electric Company of Pittsfield, Mass.;
(9) Thermoplastic polyesters, such as polyethylene terephthalate, polybutylene terephthalate, polyethylene terephthalate/glycol modified, poly(trimethylene terepthalate), and elastomers sold under the trademarks HYTREL® by E.I. DuPont de Nemours & Co. of Wilmington, Del., and LOMOD® by General Electric Company of Pittsfield, Mass.;
(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and
(11) Blends of thermoplastic rubbers with polyethylene, propylene, polyacetal, nylon, polyesters, cellulose esters, and the like.

Preferably, the inner and/or outer covers include polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly (phenylene sulfide), acrylonitrile-butadiene, acrylic-styrene-acrylonitrile, poly(ethylene terephthalate), poly(butylene terephthalate), poly(vinyl alcohol), poly(tetrafluoroethylene) and their copolymers including functional comonomers, and blends thereof. Suitable layer compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 16 to 35 weight percent, making the ionomer a high modulus ionomer. In a higher spin embodiment, the inner cover layer includes an ionomer where an acid is present in about 10 to 15 weight percent and includes a softening comonomer. Additionally, high-density polyethylene ("HDPE"), low-density polyethylene ("LDPE"), LLDPE, and homo- and co-polymers of polyolefin are suitable for a variety of golf ball layers.

While also suitable for intermediate layers, in one embodiment, the outer cover preferably includes a polyurethane composition comprising the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("H$_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Polyisocyanates are known to those of ordinary skill in the art as having more than one isocyanate group, e.g., di-isocyanate, tri-isocyanate, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, and more preferably, less than about 7.0%.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Suitable polyester polyols include, but are not limited to, polyethylene adipate glycol; polybutylene adipate glycol; polyethylene propylene adipate glycol; o-phthalate-1,6-hexanediol; poly (hexamethylene adipate) glycol; and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl)ether; and mixtures thereof. Preferred hydroxy-terminated curatives include 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a preferred embodiment of the present invention, saturated polyurethanes used to form cover layers, preferably the outer cover layer, and may be selected from among both castable thermoset and thermoplastic polyurethanes.

In this embodiment, the saturated polyurethanes of the present invention are substantially free of aromatic groups or moieties. Saturated polyurethanes suitable for use in the invention are a product of a reaction between at least one polyurethane prepolymer and at least one saturated curing agent. The polyurethane prepolymer is a product formed by a reaction between at least one saturated polyol and at least one saturated diisocyanate. As is well known in the art, a catalyst may be employed to promote the reaction between the curing agent and the isocyanate and polyol.

Saturated diisocyanates which can be used include, without limitation, ethylene diisocyanate; propylene-1,2-diisocyanate; tetramethylene-1,4-diisocyanate; 1,6-hexamethylene-diisocyanate ("HDI"); 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate ("HMDI") and isophorone diisocyanate ("IPDI").

Saturated polyols which are appropriate for use in this invention include without limitation polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol-initiated polycaprolactone, 1,4-butanediol-initiated polycaprolactone, 1,6-hexanediol-initiated polycaprolactone; trimethylol propane-initiated polycaprolactone, neopentyl glycol initiated polycaprolactone, and polytetramethylene ether glycol-initiated polycaprolactone. The most preferred saturated polyols are polytetramethylene ether glycol and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine; ethylene diamine; diethylene triamine; triethylene tetramine; tetraethylene pentamine; 4,4'-dicyclohexylmethane diamine; 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino) cyclohexane; isophorone diamine; hexamethylene diamine; propylene diamine; 1-methyl-2,4-cyclohexyl diamine; 1-methyl-2,6-cyclohexyl diamine; 1,3-diaminopropane; dimethylamino propylamine; diethylamino propylamine; imido-bis-propylamine; isomers and mixtures of isomers of diaminocyclohexane; monoethanolamine; diethanolamine; triethanolamine; monoisopropanolamine; and diisopropanolamine. The most preferred saturated curatives are 1,4-butanediol, 1,4-cyclohexyldimethylol and 4,4'-bis-(sec-butylamino)-dicyclohexylmethane.

The compositions of the invention may also be polyurea-based, which are distinctly different from polyurethane compositions, but also can result in desirable aerodynamic and aesthetic characteristics when used in golf ball components. The polyurea-based compositions are preferably saturated in nature.

Without being bound to any particular theory, it is now believed that substitution of the long chain polyol segment in the polyurethane prepolymer with a long chain polyamine oligomer soft segment to form a polyurea prepolymer, improves shear, cut, and resiliency, as well as adhesion to other components. Thus, the polyurea compositions of this invention may be formed from the reaction product of an isocyanate and polyamine prepolymer crosslinked with a curing agent. For example, polyurea-based compositions of the invention may be prepared from at least one isocyanate, at least one polyether amine, and at least one diol curing agent or at least one diamine curing agent.

Any polyamine available to one of ordinary skill in the art is suitable for use in the polyurea prepolymer. Polyether amines are particularly suitable for use in the prepolymer. As used herein, "polyether amines" refer to at least polyoxyalkyleneamines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

Suitable polyether amines include, but are not limited to, methyldiethanolamine; polyoxyalkylenediamines such as, polytetramethylene ether diamines, polyoxypropylenetriamine, and polyoxypropylene diamines; poly(ethylene oxide capped oxypropylene) ether diamines; propylene oxide-based triamines; triethyleneglycoldiamines; trimethylolpropane-based triamines; glycerin-based triamines; and mixtures thereof. In one embodiment, the polyether amine used to form the prepolymer is JEFFAMINE® D2000 (manufactured by Huntsman Chemical Co. of Austin, Tex.).

The molecular weight of the polyether amine for use in the polyurea prepolymer may range from about 100 to about 5000. As used herein, the term "about" is used in connection with one or more numbers or numerical ranges, should be understood to refer to all such numbers, including all numbers in a range. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 3000, and more preferably is between about 1500 to about 2500. Because lower molecular weight polyether amines may be prone to forming solid polyureas, a higher molecular weight oligomer, such as Jeffamine D2000, is preferred.

In one embodiment, the polyether amine has the generic structure:

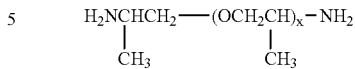

wherein the repeating unit x has a value ranging from about 1 to about 70. Even more preferably, the repeating unit may be from about 5 to about 50, and even more preferably is from about 12 to about 35.

In another embodiment, the polyether amine has the generic structure:

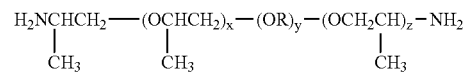

wherein the repeating units x and z have combined values from about 3.6 to about 8 and the repeating unit y has a value ranging from about 9 to about 50, and wherein R is —(CH$_2$)$_a$—, where "a" may be a repeating unit ranging from about 1 to about 10.

In yet another embodiment, the polyether amine has the generic structure:

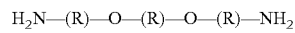

wherein R is —(CH$_2$)$_a$—, and "a" may be a repeating unit ranging from about 1 to about 10.

As briefly discussed above, some amines may be unsuitable for reaction with the isocyanate because of the rapid reaction between the two components. In particular, shorter chain amines are fast reacting. In one embodiment, however, a hindered secondary diamine may be suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (CLEARLINK® 1000) may be suitable for use in combination with an isocyanate to form the polyurea prepolymer.

Any isocyanate available to one of ordinary skill in the art is suitable for use in the polyurea prepolymer. Isocyanates for use with the present invention include aliphatic, cycloaliphatic, araliphatic, aromatic, any derivatives thereof, and combinations of these compounds having two or more isocyanate (NCO) groups per molecule. The isocyanates may be organic polyisocyanate-terminated prepolymers. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic, or linear or branched hydrocarbon moiety containing from about 1 to about 20 carbon atoms. The diisocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of diisocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4'-triisocyanate; naphthylene-1,5-diisocyanate; 2,4'-, 4,4'-, and 2,2-biphenyl diisocyanate; polyphenyl polymethylene polyisocyanate (PMDI); mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Examples of saturated diisocyanates that can be used with the present invention include, but are not limited to, ethylene diisocyanate; propylene-1,2-diisocyanate; tetramethylene diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; and mixtures thereof. Aromatic aliphatic isocyanates may also be used to form light stable materials. Examples of such isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In addition, the aromatic aliphatic isocyanates may be mixed with any of the saturated isocyanates listed above for the purposes of this invention.

The number of unreacted NCO groups in the polyurea prepolymer of isocyanate and polyether amine may be varied to control such factors as the speed of the reaction, the resultant hardness of the composition, and the like. For instance, the number of unreacted NCO groups in the polyurea prepolymer of isocyanate and polyether amine may be less than about 14 percent. In one embodiment, the polyurea prepolymer has from about 5 percent to about 11 percent unreacted NCO groups, and even more preferably has from about 6 to about 9.5 percent unreacted NCO groups. In one embodiment, the percentage of unreacted NCO groups is about 3 percent to about 9 percent. Alternatively, the percentage of unreacted NCO groups in the polyurea prepolymer may be about 7.5 percent or less, and more preferably, about 7 percent or less. In another embodiment, the unreacted NCO content is from about 2.5 percent to about 7.5 percent, and more preferably from about 4 percent to about 6.5 percent.

When formed, polyurea prepolymers may contain about 10 percent to about 20 percent by weight of the prepolymer of free isocyanate monomer. Thus, in one embodiment, the polyurea prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

The polyether amine may be blended with additional polyols to formulate copolymers that are reacted with excess isocyanate to form the polyurea prepolymer. In one embodiment, less than about 30 percent polyol by weight of the copolymer is blended with the saturated polyether amine. In another embodiment, less than about 20 percent polyol by weight of the copolymer, preferably less than about 15 percent by weight of the copolymer, is blended with the polyether amine. The polyols listed above with respect to the polyurethane prepolymer, e.g., polyether polyols, polycaprolactone polyols, polyester polyols, polycarbonate polyols, hydrocarbon polyols, other polyols, and mixtures thereof, are also suitable for blending with the polyether amine. The molecular weight of these polymers may be from about 200 to about 4000, but also may be from about 1000 to about 3000, and more preferably are from about 1500 to about 2500.

The polyurea composition can be formed by crosslinking the polyurea prepolymer with a single curing agent or a blend of curing agents. The curing agent of the invention is preferably an amine-terminated curing agent, more preferably a secondary diamine curing agent so that the composition contains only urea linkages. In one embodiment, the amine-terminated curing agent may have a molecular weight of about 64 or greater. In another embodiment, the molecular weight of the amine-curing agent is about 2000 or less. As discussed above, certain amine-terminated curing agents may be modified with a compatible amine-terminated freezing point depressing agent or mixture of compatible freezing point depressing agents.

Suitable amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; triethanolamine; monoisopropanolamine, diisopropanolamine; isophoronediamine; 4,4'-methylenebis-(2-chloroaniline); 3,5;dimethylthio-2,4-toluenediamine; 3,5-dimethylthio-2,6-toluenediamine; 3,5-diethylthio-2,4-toluenediamine; 3,5;diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; N,N,N',N'-tetrakis (2-hydroxypropyl) ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; and mixtures thereof. In one embodiment, the amine-terminated curing agent is 4,4'-bis-(sec-butylamino)-dicyclohexylmethane.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 4,4'-methylenebis-(2,6-diethylaminocyclohexane; 1,4-cyclohexane-bis-(methylamine); 1,3-cyclohexane-bis-(methylamine); diethylene glycol di-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; triisopropanolamine; and mixtures thereof.

In addition, any of the polyether amines listed above may be used as curing agents to react with the polyurea prepolymers.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

Thermoplastic materials may be blended with other thermoplastic materials, but thermosetting materials are difficult if not impossible to blend homogeneously after the thermosetting materials are formed. Preferably, the saturated polyurethane comprises from about 1% to about 100%, more preferably from about 10% to about 75% of the cover composition and/or the intermediate layer composition. About 90% to about 10%, more preferably from about 90% to about 25% of the cover and/or the intermediate layer composition is comprised of one or more other polymers and/or other materials as described below. Such polymers include, but are not limited to polyurethane/polyurea ionomers, polyurethanes or polyureas, epoxy resins, polyethylenes, polyamides and polyesters, polycarbonates and polyacrylin. Unless otherwise stated herein, all percentages are given in percent by weight of the total composition of the golf ball layer in question.

Polyurethane prepolymers are produced by combining at least one polyol, such as a polyether, polycaprolactone, polycarbonate or a polyester, and at least one isocyanate. Thermosetting polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance.

Thermoplastic polyurethanes may be blended with suitable materials to produce a thermoplastic end product. Examples of such additional materials may include ionomers such as the SURLYN®, ESCOR® and IOTEK® copolymers described above.

Other suitable materials which may be combined with the saturated polyurethanes in forming the cover and/or intermediate layer(s) of the golf balls of the invention include ionic or non-ionic polyurethanes and polyureas, epoxy resins, polyethylenes, polyamides and polyesters. For example, the cover and/or intermediate layer may be formed from a blend of at least one saturated polyurethane and thermoplastic or thermoset ionic and non-ionic urethanes and polyurethanes, cationic urethane ionomers and urethane epoxies, ionic and non-ionic polyureas and blends thereof. Examples of suitable urethane ionomers are disclosed in U.S. Pat. No. 5,692,974 entitled "Golf Ball Covers", the disclosure of which is hereby incorporated by reference in its entirety. Other examples of suitable polyurethanes are described in U.S. Pat. No. 5,334,673. Examples of appropriate polyureas are discussed in U.S. Pat. No. 5,484,870 and examples of suitable polyurethanes cured with epoxy group containing curing agents are disclosed in U.S. Pat. No. 5,908,358, the disclosures of which are hereby incorporated herein by reference in their entirety.

A variety of conventional components can be added to the cover compositions of the present invention. These include, but are not limited to, white pigment such as $TiO_2$, ZnO, optical brighteners, surfactants, processing aids, foaming agents, density-controlling fillers, UV stabilizers and light stabilizers. Saturated polyurethanes are resistant to discoloration. However, they are not immune to deterioration in their mechanical properties upon weathering. Addition of UV absorbers and light stabilizers therefore helps to maintain the tensile strength and elongation of the saturated polyurethane elastomers. Suitable UV absorbers and light stabilizers include TINUVIN® 328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Any method known to one of ordinary skill in the art may be used to polyurethanes of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

Additional components which can be added to the polyurethane composition include UV stabilizers and other dyes, as well as optical brighteners and fluorescent pigments and dyes. Such additional ingredients may be added in any amounts that will achieve their desired purpose. It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety.

The outer cover is preferably formed around the inner cover by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 to Brown et al. and U.S. Pat. No. 5,334,673 to Wu both also disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety. However, the method of the invention is not limited to the use of these techniques.

Depending on the desired properties, balls prepared according to the invention can exhibit substantially the same or higher resilience, or coefficient of restitution ("COR"), with a decrease in compression or modulus, compared to balls of conventional construction. Additionally, balls prepared according to the invention can also exhibit substantially higher resilience, or COR, without an increase in compression, compared to balls of conventional construction. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The molding process and composition of golf ball portions typically results in a gradient of material properties. Methods employed in the prior art generally exploit hardness to quantify these gradients. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C.

U.S. application Ser. No. 10/230,015, now U.S. Publication No. 2003/0114565, and U.S. application Ser. No. 10/108,793, now U.S. Publication No. 2003/0050373, which are incorporated by reference herein in their entirety, discuss soft, high resilient ionomers, which are preferably from neutralizing the acid copolymer(s) of at least one E/X/Y copolymer, where E is ethylene, X is the $\alpha,\beta$-ethylenically unsaturated carboxylic acid, and Y is a softening co-monomer. X is preferably present in 2-30 (preferably 4-20, most preferably 5-15) wt. % of the polymer, and Y is preferably present in 17-40 (preferably 20-40, and more preferably 24-35) wt. % of the polymer. Preferably, the melt index (MI) of the base resin is at least 20, or at least 40, more preferably, at least 75 and most preferably at least 150. Particular soft, resilient ionomers included in this invention are partially neutralized ethylene/(meth)acrylic acid/butyl(meth)acrylate copolymers having an MI and level of neutralization that results in a melt processable polymer that has useful physical properties. The copolymers are at least partially neutralized. Preferably at least 40, or, more preferably at least 55, even more preferably about 70, and most preferably about 80 of the acid moiety of the acid copolymer is neutralized by one or more alkali metal, transition metal, or alkaline earth metal cations. Cations useful in making the ionomers of this invention comprise lithium, sodium, potassium, magnesium, calcium, barium, or zinc, or a combination of such cations.

The invention also relates to a "modified" soft, resilient thermoplastic ionomer that comprises a melt blend of (a) the acid copolymers or the melt processable ionomers made therefrom as described above and (b) one or more organic acid(s) or salt(s) thereof, wherein greater than 80%, preferably greater than 90% of all the acid of (a) and of (b) is neutralized. Preferably, 100% of all the acid of (a) and (b) is neutralized by a cation source. Preferably, an amount of cation source in excess of the amount required to neutralize 100% of the acid in (a) and (b) is used to neutralize the acid in (a) and (b). Blends with fatty acids or fatty acid salts are preferred.

The organic acids or salts thereof are added in an amount sufficient to enhance the resilience of the copolymer. Preferably, the organic acids or salts thereof are added in an amount sufficient to substantially remove remaining ethylene crystallinity of the copolymer.

Preferably, the organic acids or salts are added in an amount of at least about 5% (weight basis) of the total amount of copolymer and organic acid(s). More preferably, the organic acids or salts thereof are added in an amount of at least about 15%, even more preferably at least about 20%. Preferably, the organic acid(s) are added in an amount up to about 50% (weight basis) based on the total amount of copolymer and organic acid. More preferably, the organic acids or salts thereof are added in an amount of up to about 40%, more preferably, up to about 35%. The non-volatile, non-migratory organic acids preferably are one or more aliphatic, mono-functional organic acids or salts thereof as described below, particularly one or more aliphatic, mono-functional, saturated or unsaturated organic acids having less than 36 carbon atoms or salts of the organic acids, preferably stearic acid or oleic acid. Fatty acids or fatty acid salts are most preferred.

Processes for fatty acid (salt) modifications are known in the art. Particularly, the modified highly-neutralized soft, resilient acid copolymer ionomers of this invention can be produced by:

(a) melt-blending (1) ethylene, $\alpha,\beta$-ethylenically unsaturated $C_{3-8}$ carboxylic acid copolymer(s) or melt-processible ionomer(s) thereof that have their crystallinity disrupted by addition of a softening monomer or other means with (2) sufficient non-volatile, non-migratory organic acids to substantially enhance the resilience and to disrupt (preferably remove) the remaining ethylene crystallinity, and then concurrently or subsequently (b) adding a sufficient amount of a cation source to increase the level of neutralization of all the acid moieties (including those in the acid copolymer and in the organic acid if the non-volatile, non-migratory organic acid is an organic acid) to the desired level.

The weight ratio of X to Y in the composition is at least about 1:20. Preferably, the weight ratio of X to Y is at least about 1:15, more preferably, at least about 1:10. Furthermore, the weight ratio of X to Y is up to about 1:1.67, more preferably up to about 1:2. Most preferably, the weight ratio of X to Y in the composition is up to about 1:2.2.

The acid copolymers used in the present invention to make the ionomers are preferably 'direct' acid copolymers (containing high levels of softening monomers). As noted above, the copolymers are at least partially neutralized, preferably at least about 40% of X in the composition is neutralized. More preferably, at least about 55% of X is neutralized. Even more preferably, at least about 70, and most preferably, at least about 80% of X is neutralized. In the event that the copolymer is highly neutralized (e.g., to at least 45%, preferably 50%, 55%, 70%, or 80%, of acid moiety), the MI of the acid copolymer should be sufficiently high so that the resulting neutralized resin has a measurable MI in accord with ASTM D-1238, condition E, at 190° C., using a 2160 gram weight. Preferably this resulting MI will be at least 0.1, preferably at least 0.5, and more preferably 1.0 or greater. Preferably, for highly neutralized acid copolymer, the MI of the acid copolymer base resin is at least 20, or at least 40, at least 75, and more preferably at least 150.

The acid copolymers preferably comprise alpha olefin, particularly ethylene, $C_{3-8}$. $\alpha,\beta$-ethylenically unsaturated carboxylic acid, particularly acrylic and methacrylic acid, and softening monomers, selected from alkyl acrylate, and alkyl methacrylate, wherein the alkyl groups have from 1-8 carbon atoms, copolymers. By "softening," it is meant that the crystallinity is disrupted (the polymer is made less crystalline). While the alpha olefin can be a $C_2$-$C_4$ alpha olefin, ethylene is most preferred for use in the present invention. Accordingly, it is described and illustrated herein in terms of ethylene as the alpha olefin.

The acid copolymers, when the alpha olefin is ethylene, can be described as E/X/Y copolymers where E is ethylene, X is the $\alpha,\beta$-ethylenically unsaturated carboxylic acid, and Y is a softening comonomer; X is preferably present in 2-30 (preferably 4-20, most preferably 5-15) wt. % of the polymer, and Y is preferably present in 17-40 (preferably 20-40, most preferably 24-35) wt. % of the polymer.

The ethylene-acid copolymers with high levels of acid (X) are difficult to prepare in continuous polymerizers because of monomer-polymer phase separation. This difficulty can be avoided however by use of "co-solvent technology" as described in U.S. Pat. No. 5,028,674, or by employing somewhat higher pressures than those which copolymers with lower acid can be prepared.

Specific acid-copolymers include ethylene/(meth)acrylic acid/n-butyl(meth)acrylate, ethylene/(meth)acrylic acid/iso-butyl(meth)acrylate, ethylene/(meth)acrylic acid/methyl (meth)acrylate, and ethylene/(meth)acrylic acid/ethyl(meth) acrylate terpolymers.

The organic acids employed are aliphatic, mono-functional (saturated, unsaturated, or multi-unsaturated) organic acids, particularly those having fewer than 36 carbon atoms. Also salts of these organic acids may be employed. Fatty acids or fatty acid salts are preferred. The salts may be any of a wide variety, particularly including the barium, lithium, sodium, zinc, bismuth, potassium, strontium, magnesium or calcium salts of the organic acids. Particular organic acids useful in the present invention include caproic acid, caprylic acid, capric acid, lauric acid, stearic acid, behenic acid, erucic acid, oleic acid, and linoleic acid.

The optional filler component is chosen to impart additional density to blends of the previously described components, the selection being dependent upon the different parts (e.g., cover, mantle, core, center, intermediate layers in a multilayered core or ball) and the type of golf ball desired (e.g., one-piece, two-piece, three-piece or multiple-piece ball), as will be more fully detailed below.

Generally, the filler will be inorganic having a density greater than about 4 g/cm$^3$, preferably greater than 5 g/cm$^3$, and will be present in amounts between 0 to about 60 wt. % based on the total weight of the composition. Examples of useful fillers include zinc oxide, barium sulfate, lead silicate and tungsten carbide, as well as the other well-known fillers used in golf balls. It is preferred that the filler materials be non-reactive or almost non-reactive and not stiffen or raise the compression nor reduce the coefficient of restitution significantly.

Additional optional additives useful in the practice of the subject invention include acid copolymer wax (e.g., Allied wax AC 143 believed to be an ethylene/16-18% acrylic acid copolymer with a number average molecular weight of 2,040), which assist in preventing reaction between the filler materials (e.g., ZnO) and the acid moiety in the ethylene copolymer. Other optional additives include $TiO_2$, which is used as a whitening agent; optical brighteners; surfactants; processing aids; etc.

Ionomers may be blended with conventional ionomeric copolymers (di-, ter-, etc.), using well-known techniques, to manipulate product properties as desired. The blends would still exhibit lower hardness and higher resilience when compared with blends based on conventional ionomers.

Also, ionomers can be blended with non-ionic thermoplastic resins to manipulate product properties. The non-ionic thermoplastic resins would, by way of non-limiting illustrative examples, include thermoplastic elastomers, such as polyurethane, poly-ether-ester, poly-amide-ether, polyether-urea, PEBAX® (a family of block copolymers based on polyether-block-amide, commercially supplied by Atochem), styrene-butadiene-styrene (SBS) block copolymers, styrene(ethylene-butylene)-styrene block copolymers, etc., poly amide (oligomeric and polymeric), polyesters, polyolefins including PE, PP, E/P copolymers, etc., ethylene copolymers with various comonomers, such as vinyl acetate, (meth)acrylates, (meth)acrylic acid, epoxy-functionalized monomer, CO, etc., functionalized polymers with maleic anhydride grafting, epoxidization etc., elastomers, such as EPDM, metallocene catalyzed PE and copolymer, ground up powders of the thermoset elastomers, etc. Such thermoplastic blends comprise about 1% to about 99% by weight of a first thermoplastic and about 99% to about 1% by weight of a second thermoplastic.

Additionally, the compositions of U.S. application Ser. No. 10/269,341, now U.S. Publication No. 2003/0130434, and U.S. Pat. No. 6,653,382, both of which are incorporated herein in their entirety, discuss compositions having high COR when formed into solid spheres.

The thermoplastic composition of this invention comprises a polymer which, when formed into a sphere that is 1.50 to 1.54 inches in diameter, has a coefficient of restitution (COR) when measured by firing the sphere at an initial velocity of 125 feet/second against a steel plate positioned 3 feet from the point where initial velocity and rebound velocity are determined and by dividing the rebound velocity from the plate by the initial velocity and an Atti compression of no more than 100.

The thermoplastic composition of this invention preferably comprises (a) aliphatic, mono-functional organic acid(s) having fewer than 36 carbon atoms; and (b) ethylene, $C_3$ to $C_8$ α,β-ethylenically unsaturated carboxylic acid copolymer(s) and ionomer(s) thereof, wherein greater than 90%, preferably near 100%, and more preferably 100% of all the acid of (a) and (b) are neutralized.

The thermoplastic composition preferably comprises melt-processible, highly-neutralized (greater than 90%, preferably near 100%, and more preferably 100%) polymer of (1) ethylene, $C_3$ to $C_8$ α,β-ethylenically unsaturated carboxylic acid copolymers that have their crystallinity disrupted by addition of a softening monomer or other means such as high acid levels, and (2) non-volatile, non-migratory agents such as organic acids (or salts) selected for their ability to substantially or totally suppress any remaining ethylene crystallinity. Agents other than organic acids (or salts) may be used.

It has been found that, by modifying an acid copolymer or ionomer with a sufficient amount of specific organic acids (or salts thereof); it is possible to highly neutralize the acid copolymer without losing processibility or properties such as elongation and toughness. The organic acids employed in the present invention are aliphatic, mono-functional, saturated or unsaturated organic acids, particularly those having fewer than 36 carbon atoms, and particularly those that are non-volatile and non-migratory and exhibit ionic array plasticizing and ethylene crystallinity suppression properties.

With the addition of sufficient organic acid, greater than 90%, nearly 100%, and preferably 100% of the acid moieties in the acid copolymer from which the ionomer is made can be neutralized without losing the processibility and properties of elongation and toughness.

The melt-processible, highly-neutralized acid copolymer ionomer can be produced by the following:

(a) melt-blending (1) ethylene α,β-ethylenically unsaturated $C_{3-8}$ carboxylic acid copolymer(s) or melt-processible ionomer(s) thereof (ionomers that are not neutralized to the level that they have become intractable, that is not melt-processible) with (1) one or more aliphatic, mono-functional, saturated or unsaturated organic acids having fewer than 36 carbon atoms or salts of the organic acids, and then concurrently or subsequently (b) adding a sufficient amount of a cation source to increase the level of neutralization all the acid moieties (including those in the acid copolymer and in the organic acid) to greater than 90%, preferably near 100%, more preferably to 100%.

Preferably, highly-neutralized thermoplastics of the invention can be made by:

(a) melt-blending (1) ethylene, α,β-ethylenically unsaturated $C_{3-8}$ carboxylic acid copolymer(s) or melt-processible ionomer(s) thereof that have their crystallinity disrupted by addition of a softening monomer or other means with (2) sufficient non-volatile, non-migratory agents to substantially remove the remaining ethylene crystallinity, and then concurrently or subsequently (b) adding a sufficient amount of a cation source to increase the level of neutralization all the acid moieties (including those in the acid copolymer and in the organic acid if the non-volatile, non-migratory agent is an organic acid) to greater than 90%, preferably near 100%, more preferably to 100%.

The acid copolymers used in the present invention to make the ionomers are preferably 'direct' acid copolymers. They are preferably alpha olefin, particularly ethylene, $C_{3-8}$ α,β-ethylenically unsaturated carboxylic acid, particularly acrylic and methacrylic acid, copolymers. They may optionally contain a third softening monomer. By "softening," it is meant that the crystallinity is disrupted (the polymer is made less crystalline). Suitable "softening" comonomers are monomers selected from alkyl acrylate, and alkyl methacrylate, wherein the alkyl groups have from 1-8 carbon atoms.

The acid copolymers, when the alpha olefin is ethylene, can be described as E/X/Y copolymers where E is ethylene, X is the α,β-ethylenically unsaturated carboxylic acid, and Y is a softening comonomer. X is preferably present in 3-30 (preferably 4-25, most preferably 5-20) wt. % of the polymer, and Y is preferably present in 0-30 (alternatively 3-25 or 10-23) wt. % of the polymer.

Spheres were prepared using fully neutralized ionomers A and B.

TABLE I

| Sample | Resin Type (%) | Acid Type (%) | Cation (% neut*) | M.I. (g/10 min) |
|---|---|---|---|---|
| 1A | A (60) | Oleic (40) | Mg (100) | 1.0 |
| 2B | A (60) | Oleic (40) | Mg (105)* | 0.9 |
| 3C | B (60) | Oleic (40) | Mg (100) | 0.9 |
| 4D | B (60) | Oleic (40) | Mg (105)* | 0.9 |
| 5E | B (60) | Stearic (40) | Mg (100) | 0.85 |

A 76.9% ethylene, 14.8% normal butyl acrylate, 8.3% acrylic acid
B 75% ethylene, 14.9% normal butyl acrylate, 10.1% acrylic acid
*indicates that cation was sufficient to neutralize 105% of all the acid in the resin and the organic acid.

These compositions were subsequently molded into spheres having an outer diameter of 1.53 inches. These spheres were then measured for Atti (PGA) compression and coefficient of restitution (at an incoming velocity of 125 ft/s). The data is presented below in the following table:

TABLE II

| Sample | Atti Compression | COR @ 125 ft/s |
|---|---|---|
| 1A | 75 | 0.826 |
| 2B | 75 | 0.826 |
| 3C | 78 | 0.837 |
| 4D | 76 | 0.837 |
| 5E | 97 | 0.807 |

A number of commercially-available highly neutralized polymers, represented by the acronyms HNP1 and HNP2, were tested for a variety of physical and mechanical properties. These are presented below in Table III:

TABLE III

Material Properties

| | HNP1 | HNP2 |
|---|---|---|
| Specific Gravity (g/cm³) | 0.966 | 0.974 |
| Melt Flow, 190° C., 10-kg load | 0.65 | 1.0 |
| Shore D Flex Bar (40 hr) | 47.0 | 46.0 |
| Shore D Flex Bar (2 week) | 51.0 | 48.0 |
| Flex Modulus, psi (40 hr) | 25,800 | 16,100 |
| Flex Modulus, psi (2 week) | 39,900 | 21,000 |
| DSC Melting Point (° C.) | 61.0 | 61/101 |
| Moisture (ppm) | 1500 | 4500 |
| Weight % Mg | 2.65 | 2.96 |

TABLE IV

Solid Sphere Data

| Material | HNP1 | HNP2 | HNP2a | HNP1a | HNP1a/HNP2a (50:50 blend) |
|---|---|---|---|---|---|
| Spec. Grav. (g/cm³) | 0.954 | 0.959 | 1.153 | 1.146 | 1.148 |
| Filler | None | None | Tungsten | Tungsten | Tungsten |
| Compression | 107 | 83 | 86 | 62 | 72 |
| COR | 0.827 | 0.853 | 0.844 | 0.806 | 0.822 |
| Shore D | 51 | 47 | 49 | 42 | 45 |
| Shore C | | | 79 | 72 | 75 |

These materials are exemplary examples of the preferred center and/or core layer compositions of the present invention. They may also be used as a cover layer herein.

The golf ball components of the present invention, in particular the core (center and/or outer core layers) may be formed from a co-polymer of ethylene and an α,β-unsaturated carboxylic acid. In another embodiment, they may be formed from a terpolymer of ethylene, an α,β-unsaturated carboxylic acid, and an n-alkyl acrylate. Preferably, the α,β-unsaturated carboxylic acid is acrylic acid or methacrylic acid. In a preferred embodiment, the n-alkyl acrylate is n-butyl acrylate. Further, in a preferred form, the co- or ter-polymer comprises a level of fatty acid salt greater than 5 phr of the base resin. The preferred fatty acid salt is magnesium oleate or magnesium stearate.

It is highly preferred that the carboxylic acid in the intermediate layer is 100% neutralized with metal ions. The metal ions used to neutralize the carboxylic acid may be any metal ion known in the art. Preferably, the metal ions comprise magnesium ions. If the material used in the intermediate layer is not 100% neutralized, the resultant resilience properties such as COR and initial velocity may not be sufficient to produce the improved initial velocity and distance properties of the present invention.

The golf ball componetns can comprise various levels of the three components of the co- or terpolymer as follows: from about 60 to about 90% ethylene, from about 8 to about 20% by weight of the α,β-unsaturated carboxylic acid, and from 0% to about 25% of the n-alkyl acrylate. The co- or terpolymer may also contain an amount of a fatty acid salt. The fatty acid salt preferably comprises magnesium oleate. These materials are commercially available from DuPont, under the tradename DuPont HPF®.

In one embodiment, the core and/or core layers (or other intermediate layers) comprises a copolymer of about 81% by weight ethylene and about 19% by weight acrylic acid, wherein 100% of the carboxylic acid groups are neutralized with magnesium ions. The copolymer also contains at least 5 phr of magnesium oleate. Material suitable for use as this layer is available from DuPont under the tradename DuPont HPF SEP 1313-4®.

In a second preferred embodiment, the core and/or core layers (or other intermediate layers) comprise a copolymer of about 85% by weight ethylene and about 15% by weight acrylic acid, wherein 100% of the acid groups are neutralized with magnesium ions. The copolymer also contains at least 5 phr of magnesium oleate. Material suitable for use as this layer is available from DuPont under the tradename DuPont HPF SEP 1313-3®.

In a third preferred embodiment, the core and/or core layers (or other intermediate layers) comprise a copolymer of about 88% by weight ethylene and about 12% by weight acrylic acid, wherein 100% of the acid groups are neutralized with magnesium ions. The copolymer also contains at least 5 phr of magnesium oleate. Material suitable for use as this layer is available from DuPont under the tradename DuPont HPF AD1027®.

In a further preferred embodiment, the core and/or core layers (or other intermediate layers) are adjusted to a target specific gravity to enable the ball to be balanced. For a 1.68-inch diameter golf ball having a ball weight of about 1.61 oz, the target specific gravity is about 1.125. It will be appreciated by one of ordinary skill in the art that the target specific gravity will vary based upon the size and weight of the golf ball. The specific gravity is adjusted to the desired target through the use of inorganic fillers. Preferred fillers used for compounding the inner layer to the desired specific gravity include, but are not limited to, tungsten, zinc oxide, barium sulfate and titanium dioxide. Other suitable fillers, in particular nano or hybrid materials, include those described in U.S. Pat. No. 6,793,592 and U.S. application Ser. No. 10/037,987, which are incorporated herein, in their entirety, by reference thereto.

Some preferred golf ball layers formed from the above compositions were molded onto a golf ball center using DuPont HPF RX-85®, Dupont HPF SEP 1313-3®, or DuPont HPF SEP 1313-4®. 1) DuPont HPF RX-85®, a copolymer of about 88% ethylene and about 12% acrylic acid, wherein 100% of the acid groups are neutralized with magnesium ions. Further, the copolymer contains a fixed amount of magnesium oleate. This material was compounded to a specific gravity of about 1.125 using tungsten. The Shore D hardness of this material (as measured on the curved surface of the inner cover layer) was about 58 to about 60. 2) DuPont HPF SEP 1313-3®, a copolymer of about 85% ethylene and about 15% acrylic acid, wherein 100% of the acid groups are neutralized with magnesium ions. Further, the copolymer contains a fixed amount of magnesium oleate. This material was compounded to a specific gravity of about 1.125 using tungsten. The Shore D hardness of this material (as measured on the curved surface of the inner cover layer) was about 58-60. 3) DuPont HPF SEP 1313-4®, a copolymer of about 81% ethylene and about 19% acrylic acid, wherein 100% of the acid groups are neutralized with magnesium ions. Further, the copolymer contains a fixed amount of magnesium oleate. This material was compounded to a specific gravity of about 1.125 using tungsten. The Shore D hardness of this material (as measured on the curved surface of the inner cover layer) was about 58-60.

The centers/cores/layers can also comprise various levels of the three components of the terpolymer as follows: from about 60% to 80% ethylene; from about 8% to 20% by weight of the α,β-unsaturated carboxylic acid; and from about 0% to 25% of the n-alkyl acrylate, preferably 5% to 25%. The terpolymer will also contain an amount of a fatty acid salt, preferably magnesium oleate. These materials are commercially available under the trade name DuPont® HPF™. In a preferred embodiment, a terpolymer suitable for the invention will comprise from about 75% to 80% by weight ethylene, from about 8% to 12% by weight of acrylic acid, and from about 8% to 17% by weight of n-butyl acrylate, wherein all of the carboxylic acid is neutralized with magnesium ions, and comprises at least 5 phr of magnesium oleate.

In another preferred embodiment, the cover layer will comprise a terpolymer of about 70% to 75% by weight ethylene, about 10.5% by weight acrylic acid, and about 15.5% to 16.5% by weight n-butyl acrylate. The acrylic acid groups are 100% neutralized with magnesium ions. The terpolymer will also contain an amount of magnesium oleate. Materials suitable for use as this layer are sold under the trade name DuPont® HPF™ AD 1027.

In yet another preferred embodiment, the centers/cores/layers comprise a copolymer comprising about 88% by weight of ethylene and about 12% by weight acrylic acid, with 100% of the acrylic acid neutralized by magnesium ions. The centers/cores/layers may also contain magnesium oleate. Material suitable for this embodiment was produced by DuPont as experimental product number SEP 1264-3. Preferably the centers/cores/layers are adjusted to a target specific gravity of 1.125 using inert fillers to adjust the density with minimal effect on the performance properties of the cover layer. Preferred fillers used for compounding the centers/cores/layers to the desired specific gravity include but are not limited to tungsten, zinc oxide, barium sulfate, and titanium dioxide.

A first set of intermediate layers were molded onto cores using DuPont® HPF™ AD1027, which is a terpolymer of about 73% to 74% ethylene, about 10.5% acrylic acid, and about 15.5% to 16.5% n-butyl acrylate, wherein 100% of the acid groups are neutralized with magnesium ions. Further, the terpolymer contains a fixed amount of greater than 5 phr magnesium oleate. This material is compounded to a specific gravity of about 1.125 using barium sulfate and titanium dioxide. The Shore D hardness of this material (as measured on the curved surface of the inner cover layer) is about 58-60.

A second set of layers were molded onto each of the experimental cores using DuPont experimental HPF™ SEP 1264-3, which is a copolymer of about 88% ethylene and about 12% acrylic acid, wherein 100% of the acid groups are neutralized with magnesium ions. Further, the copolymer contains a fixed amount of at least 5 phr magnesium oleate. This material is compounded to a specific gravity of about 1.125 using zinc oxide. The Shore D hardness of this material (as measured on the curved surface of the inner cover layer) is about 61-64.

A first set of covers were molded onto each of the core/layer components using DuPont HPF™ 1000, which is a terpolymer of about 75% to 76% ethylene, about 8.5% acrylic acid, and about 15.5% to 16.5% n-butyl acrylate, wherein 100% of the acid groups are neutralized with magnesium ions. Further, the terpolymer contains a fixed amount of at least 5 phr of magnesium stearate. This material is compounded to a target specific gravity of about 1.125 using barium sulfate and titanium dioxide. The Shore D hardness of this material (as measured on the curved surface of the molded golf ball) is about 60-62.

In one embodiment, the formation of a golf ball starts with forming the inner core. The inner core, outer core, and the cover are formed by compression molding, by injection molding, or by casting. These methods of forming cores and covers of this type are well known in the art. The materials used for the inner and outer core, as well as the cover, are selected so that the desired playing characteristics of the ball are achieved. The inner and outer core materials have substantially different material properties so that there is a predetermined relationship between the inner and outer core materials, to achieve the desired playing characteristics of the ball.

In one embodiment, the inner core is formed of a first material having a first Shore D hardness, a first elastic modulus, a first specific gravity, and a first Bashore resilience. The outer core is formed of a second material having a second Shore D hardness, a second elastic modulus, a second specific gravity, and a second Bashore resilience. Preferably, the material property of the first material equals at least one selected from the group consisting of the first Shore D hardness differing from the second Shore D hardness by at least 10 points, the first elastic modulus differing from the second elastic modulus by at least 10%, the first specific gravity differing from the second specific gravity by at least 0.1, or a first Bashore resilience differing from the second Bashore resilience by at least 10%. It is more preferred that the first material have all of these material property relationships.

Moreover, it is preferred that the first material has the first Shore D hardness between about 30 and about 80, the first elastic modulus between about 5,000 psi and about 100,000 psi, the first specific gravity between about 0.8 and about 1.6, and the first Bashore resilience greater than 30%.

In another embodiment, the first Shore D hardness is less than the second Shore D hardness, the first elastic modulus is less than the second elastic modulus, the first specific gravity is less than the second specific gravity, and the first Bashore resilience is less than the second Bashore resilience. In another embodiment, the first material properties are greater than the second material properties. The relationship between the first and second material properties depends on the desired playability characteristics.

Suitable inner and outer core materials include HNP's neutralized with organic fatty acids and salts thereof, metal cations, or a combination of both, thermosets, such as rubber, polybutadiene, polyisoprene; thermoplastics, such as ionomer resins, polyamides or polyesters; or thermoplastic elastomers. Suitable thermoplastic elastomers include PEBAX®, HYTREL®, thermoplastic urethane, and KRATON®, which are commercially available from Elf-Atochem, DuPont, BF Goodrich, and Shell, respectively. The inner and outer core materials can also be formed from a castable material. Suitable castable materials include, but are not limited to, urethane, urea, epoxy, diols, or curatives.

The cover is selected from conventional materials used as golf ball covers based on the desired performance characteristics. The cover may be comprised of one or more layers. Cover materials such as ionomer resins, blends of ionomer resins, thermoplastic or thermoset urethanes, and balata, can be used as known in the art and discussed above. In other embodiments, additional layers may be added to those mentioned above or the existing layers may be formed by multiple materials.

When the core is formed with a fluid-filled center, the center is formed first then the inner core is molded around the center. Conventional molding techniques can be used for this operation. Then the outer core and cover are formed thereon, as discussed above. The fluid within the inner core can be a wide variety of materials including air, water solutions, liquids, gels, foams, hot-melts, other fluid materials and combinations thereof. The fluid is varied to modify the performance parameters of the ball, such as the moment of inertia or the spin decay rate. Examples of suitable liquids include either solutions such as salt in water, corn syrup, salt in water and corn syrup, glycol and water or oils. The liquid can further include pastes, colloidal suspensions, such as clay, barytes, carbon black in water or other liquid, or salt in water/glycol mixtures. Examples of suitable gels include water gelatin gels, hydrogels, water/methyl cellulose gels and gels comprised of copolymer rubber based materials such a styrene-butadiene-styrene rubber and paraffinic and/or naphthenic oil. Examples of suitable melts include waxes and hot melts. Hot-melts are materials which at or about normal room temperatures are solid but at elevated temperatures become liquid. A high melting temperature is desirable since the liquid core is heated to high temperatures during the molding of the inner core, outer core, and the cover. The liquid can be a reactive liquid system, which combines to form a solid. Examples of suitable reactive liquids are silicate gels, agar gels, peroxide cured polyester resins, two part epoxy resin systems and peroxide cured liquid polybutadiene rubber compositions.

The "effective compression constant," which is designated EC, is the ratio of deflection of a 1.50 inch diameter sphere made of any single material used in the core under a 100 kg load that as represented by the formula $EC=F/d$, where, F is a 100 kg load; and d is the deflection in millimeters. If the sphere tested is only inner core material, the effective compression constant for the inner core material alone is designated $EC_{IC}$. If the sphere tested is only outer core material, the effective compression constant for the outer core material alone is designated $EC_{OC}$. The sum of the constants for the inner core $EC_{IC}$ and outer core $EC_{OC}$ is the constant $EC_S$. If the sphere tested is inner and outer core material, the core effective compression constant is designated $EC_C$. It is has been determined that very favorable cores are formed when their core effective compression constant $EC_C$ is less than the sum of the effective compression constants of the inner core and outer core $EC_S$. It is recommended that the core effective compression constant $EC_C$ is less than about 90% of the sum of the effective compression constants of the inner core and outer core $EC_S$. More preferably, the core effective compression constant $EC_C$ is less than or equal to about 50% of the sum of the effective compression constants of the inner core and outer core $EC_S$. The ratios of the inner core material to outer core material and the geometry of the inner core to the outer core are selected to achieve these core effective compression constants.

The resultant golf balls typically have a coefficient of restitution of greater than about 0.7, preferably greater than about 0.75, and more preferably greater than about 0.78. The golf balls also typically have an Atti compression of at least about 40, preferably from about 50 to 120, and more preferably from about 60 to 100. The golf ball cured polybutadiene material typically has a hardness of at least about 15 Shore A, preferably between about 30 Shore A and 80 Shore D, more preferably between about 50 Shore A and 60 Shore D.

In addition to the HNP's neutralized with organic fatty acids and salts thereof, core compositions may comprise at least one rubber material having a resilience index of at least about 40. Preferably the resilience index is at least about 50. Polymers that produce resilient golf balls and, therefore, are suitable for the present invention, include but are not limited to CB23, CB22, commercially available from of Bayer Corp. of Orange, Tex., BR60, commercially available from Enichem of Italy, and 1207G, commercially available from Goodyear Corp. of Akron, Ohio.

Additionally, the unvulcanized rubber, such as polybutadiene, in golf balls prepared according to the invention typically has a Mooney viscosity of between about 40 and about 80, more preferably, between about 45 and about 65, and most preferably, between about 45 and about 55. Mooney viscosity is typically measured according to ASTM-D1646.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 500 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-D2240, less than about 45 Shore D, preferably less than about 40 Shore D, more preferably between about 25 and about 40 Shore D, and most preferably between about 30 and about 40 Shore D. The casing preferably has a material hardness of less than about 70 Shore D, more preferably between about 30 and about 70 Shore D, and most preferably, between about 50 and about 65 Shore D.

In a preferred embodiment, the intermediate layer material hardness is between about 40 and about 70 Shore D and the outer cover layer material hardness is less than about 40 Shore D. In a more preferred embodiment, a ratio of the intermediate layer material hardness to the outer cover layer material hardness is greater than 1.5.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

In one embodiment, the core of the present invention has an Atti compression of between about 50 and about 90, more preferably, between about 60 and about 85, and most preferably, between about 65 and about 85. The overall outer diameter ("OD") of the core is less than about 1.590 inches, preferably, no greater than about 1.580 inches, more preferably between about 1.540 inches and about 1.580 inches, and most preferably between about 1.525 inches to about 1.570 inches. The OD of the casing of the golf balls of the present invention is preferably between 1.580 inches and about 1.640 inches, more preferably between about 1.590 inches to about 1.630 inches, and most preferably between about 1.600 inches to about 1.630 inches.

The present multilayer golf ball can have an overall diameter of any size. Although the United States Golf Association ("USGA") specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The golf balls of the present invention should have a moment of inertia ("MOI") of less than about 85 and, preferably, less than about 83. The MOI is typically measured on model number MOI-005-104 Moment of Inertia Instrument manufactured by Inertia Dynamics of Collinsville, Conn. The instrument is plugged into a PC for communication via a COMM port and is driven by MOI Instrument Software version #1.2.

U.S. Pat. Nos. 6,193,619; 6,207,784; and 6,221,960, and U.S. application Ser. No. 09/594,031, filed Jun. 15, 2000; Ser. No. 09/677,871, filed Oct. 3, 2000, and Ser. No. 09/447,652, filed Nov. 23, 1999, are incorporated in their entirety herein by express reference thereto.

The highly-neutralized polymers of the present invention may also be used in golf equipment, in particular, inserts for golf clubs, such as putters, irons, and woods, and in golf shoes and components thereof.

Other than in the operating examples, or unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:
 a core;
 a cover having a first water vapor transmission rate; and
 a vapor barrier layer disposed between the core and the cover, the barrier layer being formed from a polymer comprising a nano-material having an average particle size of 100 nm or less;

wherein the nano-material creates a tortuous path across the barrier layer such that the barrier layer has a second water vapor transmission rate less than the first and the nano-material is selected from the group consisting of smectite minerals; carbon nanotubes; fullerenes; single-wall and multi-wall carbon nanotubes; polymer nanofibers; carbon nanofibrils; nitrides; carbides; sulfides; ormocers; glass ionomers; resin-modified glass ionomers; silicon ionomers; polymerizable cements; metal-oxide polymer composites; lipid-based nanotubules, polyhedral oligomeric silsequioxanes and platelet materials.

2. The golf ball of claim 1, wherein the second water vapor transmission rate is 0.45 (g·mm)/(m²·day) or less.

3. The golf ball of claim 2, wherein the second water vapor transmission rate is 0.25 (g·mm)/(m²·day) or less.

4. The golf ball of claim 1, wherein the polymer comprises ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers and their ionomers, cationic ionomers, anionic ionomers, polyurethanes, or polyureas.

5. The golf ball of claim 1, wherein the nano-materials are chemically-modified.

6. The golf ball of claim 1, wherein the core has an outer diameter of 1.5 inches to 1.6 inches.

7. The golf ball of claim 6, wherein the core comprises a solid center having an outer diameter of 0.5 inches to 1.25 inches, and an outer core layer.

8. The golf ball of claim 1, wherein the core comprises a rubber-based polymer or a polymer comprising an acid group fully-neutralized by a salt of an organic acid, a cation source, or a suitable base of the organic acid.

9. The golf ball of claim 1, wherein the cover layer comprises a polyurethane, a polyurea, a polyurea-urethane, or a polyurethane-urea.

10. The golf ball of claim 1, wherein the cover layer comprises the nano-materials and has a water vapor transmission rate of 0.45 (g·mm)/(m²·day) or less.

11. The golf ball of claim 1, wherein the cover layer has a thickness of 0.005 inches to 0.05 inches.

12. The golf ball of claim 1, wherein the cover layer is fully saturated.

13. A golf ball comprising:
a rubber-based core having an outer diameter of 1.5 inches to 1.55 inches;
a cover layer comprising a polyurethane or a polyurea and having a first water vapor transmission rate; and
a vapor barrier layer disposed between the core and the cover, the barrier layer being formed from a polymer comprising a nano-material having an average particle size of 100 nm or less;
wherein the nano-materials create a tortuous path across the barrier layer such that the barrier layer has a second water vapor transmission rate less than the first; and are selected from the group consisting of smectite minerals; carbon nanotubes; fullerenes; single-wall and multi-wall carbon nanotubes; polymer nanofibers; carbon nanofibrils; nitrides; carbides; sulfides; ormocers; glass ionomers; resin-modified glass ionomers; silicon ionomers; polymerizable cements; metal-oxide polymer composites; lipid-based nanotubules, platelet materials, and polyhedral oligomeric silsequioxanes.

14. The golf ball of claim 13, wherein the cover layer is fully saturated.

15. The golf ball of claim 13, wherein the barrier layer comprises a polymer selected from the group consisting of ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers and their ionomers, cationic ionomers, anionic ionomers, polyurethanes, or polyureas.

16. The golf ball of claim 13, wherein the vapor barrier layer polymer comprises a an acid group, a salt of an organic acid, and sufficient cation source to fully-neutralize the acid group.

17. A golf ball comprising:
a core;
a cover layer comprising a polyurethane or a polyurea and having a first water vapor transmission rate; and
a vapor barrier layer disposed between the core and the cover, the barrier layer being formed from a polymer comprising a nano-material having an average particle size of 100 nm or less;
wherein the nano-materials create a tortuous path across the barrier layer such that the barrier layer has a second water vapor transmission rate less than the first; and comprise a swellable layered material selected from the group consisting of phyllosilicates, montmorillonite, sodium montmorillonite; magnesium montmorillonite; calcium montmorillonite; nontronite; beidellite; volkonskoite; hectorite; saponite; sauconite; sobockite; stevensite; svinfordite; and vermiculite.

18. The golf ball of claim 17, wherein the phyllosilicates have a negative charge ranging from about 0.15 to about 0.9 charges per formula unit and a commensurate number of exchangeable metal cations.

19. The golf ball of claim 17, wherein at least one of the core or the vapor barrier layer comprises a polymer comprising an acid group, a salt of an organic acid, and sufficient cation source to fully-neutralize the acid group.

* * * * *